United States Patent
Chien et al.

(10) Patent No.: US 8,142,250 B2
(45) Date of Patent: Mar. 27, 2012

(54) METHOD OF FORMING A COLOR FILTER TOUCH SENSING SUBSTRATE

(75) Inventors: Yu-Feng Chien, Hsin-Chu (TW); Chau-Shiang Huang, Hsin-Chu (TW); Tun-Chun Yang, Hsin-Chu (TW); Seok-Lyul Lee, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/245,890

(22) Filed: Sep. 27, 2011

(65) Prior Publication Data
US 2012/0015464 A1 Jan. 19, 2012

Related U.S. Application Data

(62) Division of application No. 12/423,814, filed on Apr. 15, 2009, now Pat. No. 8,052,498.

(30) Foreign Application Priority Data

Dec. 3, 2008 (TW) ................................ 97146919 A

(51) Int. Cl.
*G03F 7/00* (2006.01)
(52) U.S. Cl. .......... 445/24; 430/314; 430/317; 430/318; 430/319
(58) Field of Classification Search .................... 445/24, 445/25; 430/311–321; 345/173–178
See application file for complete search history.

(56) References Cited

U.S. PATENT DOCUMENTS

| 4,550,221 A | 10/1985 | Mabusth |
| 6,057,903 A | 5/2000 | Colgan et al. |
| 2008/0007534 A1 | 1/2008 | Peng et al. |
| 2009/0160824 A1 | 6/2009 | Chih-Yung |
| 2010/0182272 A1 | 7/2010 | Kang |
| 2010/0233930 A1 | 9/2010 | Ishida |

FOREIGN PATENT DOCUMENTS

| CN | 101149502 | 3/2008 |
| WO | 2007001155 A1 | 1/2007 |

*Primary Examiner* — Mariceli Santiago
(74) *Attorney, Agent, or Firm* — Winston Hsu; Scott Margo

(57) ABSTRACT

A method of forming a color filter touch sensing substrate integrates touch-sensing structures/elements of a touch panel into the inner side of the color filter substrate, which faces a thin film transistor substrate, and forms patterned assistant electrodes on the surfaces of the transparent sensing pads for decreasing the equivalent resistance of the touch-sensing structures/elements. Moreover, since an adjacent transparent conductive layer and an assistant electrode layer are patterned to form the transparent sensing pads and the patterned assistant electrodes, a simplified pattern-transferring process can be applied to the transparent sensing pads and the patterned assistant electrodes, or bridge structures can be formed from the assistant electrode layer for electrically connecting between some transparent sensing pads. Therefore, the forming process is simplified.

12 Claims, 23 Drawing Sheets

METHOD OF FORMING A COLOR FILTER TOUCH SENSING SUBSTRATE

CROSS REFERENCE TO RELATED APPLICATIONS

This application is a division of application Ser. No. 12/423,814 filed on Apr. 15, 2009.

BACKGROUND OF THE INVENTION

1. Field of the Invention

The present invention is related to a method of forming a color filter touch sensing substrate, and more particularly, to a method of forming a color filter touch sensing substrate with capacitive touch function and capacitive structures (capacitive elements).

2. Description of the Prior Art

Since portable information products, such as PDAs, mobile phones, notebooks, and tablet PCs have become more and more prevalent in everyday life, touch panels have been broadly applied to these products as an input interface. The touch panel has become one of the most important components in tablet PCs with high requirements, because it integrates the input functions with the output functions in the same interface (display).

The conventional method of fabricating a touch display panel includes forming the touch panel and the display panel individually, then assembling the touch panel and the display panel afterwards. Therefore, the conventional touch display panel usually has problems such as heavy weight, high cost, large size, and low transmittance. To solve the problems mentioned above, the touch function has recently been integrated into the display panel. By touching the display panel to vary the capacitance of the sensing pads in the sensing layer, sensing current signals will be generated to form the display panel with touch function. FIG. 1 shows a schematic diagram of a capacitive touch display panel 10 according to the prior art. As shown in FIG. 1, the capacitive touch display panel 10 includes a color filter substrate (CF substrate) 30, a thin film transistor substrate (TFT substrate) 20 and a liquid crystal layer 40. The liquid crystal layer 40 is disposed between the CF substrate 30 and the TFT substrate 20. The liquid crystal molecules of the liquid crystal layer 40 will twist and rotate due to an electric field so as to alter the polarization direction of light. The TFT substrate 20 faces the CF substrate 30. The TFT substrate 20 includes a glass substrate 24 and an array layer 22. The array layer 22 may include TFT structures, pixel electrodes, scan lines, data lines and other elements for controlling pixels (not shown).

The conventional CF substrate 30 is formed by a double side process, and the CF substrate 30 usually includes a glass substrate 36, a capacitive sensing layer 50, a black matrix 34, a color filter 32, and a common electrode (not shown). According to the conventional method, the formation of the CF substrate 30 includes forming a capacitive sensing layer 50 at the outer side of the glass substrate 36, then the glass substrate 36 is turned to the opposite side to form the black matrix 34, the color filter 32, and the common electrode on the inner side of the glass substrate 36. However, due to the fabricating method of the CF substrate 30, the thickness of the glass substrate 36 cannot be thinned down after the elements are formed on the two sides of the CF substrate 30. Therefore the thickness of the conventional glass substrate 36 is usually greater than 0.5 millimeters. Furthermore, because the capacitive sensing layer 50 is disposed at the outer side of the glass substrate 36, the capacitive sensing layer 50 must be made of structures and materials with the characteristics of high hardness and high stability. In this way, the designing variety of the CF substrate 30 will be limited. Additionally, the touch sensitivity of the capacitive touch display panel 10 needs to be improved to enhance the performance of the capacitive touch display panel 10.

SUMMARY OF THE INVENTION

It is one objective of the present invention to provide a method of forming a color filter touch sensing substrate to integrate touch-sensing structures to the inner side of the color filter substrate. In this way, the reliability of the display panel will be increased, the variety of the materials will be enhanced, and the thinning process can be performed more easily.

According to a preferred embodiment of the present invention, a color filter touch sensing substrate is disposed corresponding to a thin film transistor substrate, and a display medium layer is disposed between the color filter touch sensing substrate and the thin film transistor substrate. The method of forming the color filter touch sensing substrate comprises the following steps. First, a transparent substrate is provided. Next, a first transparent conductive layer and an assistant electrode layer are formed sequentially on a side of the transparent substrate facing the thin film transistor substrate. Thereafter, the first transparent conductive layer and the assistant electrode layer are patterned, wherein: the first transparent conductive layer after patterning forms at least two first transparent sensing pads and at least two second transparent sensing pads; the assistant electrode layer after patterning forms at least two first patterned assistant electrodes and at least two second patterned assistant electrodes; the at least two first transparent sensing pads are electrically isolated from the at least two second transparent sensing pads; the at least two first patterned assistant electrodes electrically connect to and contact with the at least two first transparent sensing pads; the least two second patterned assistant electrodes electrically connect to and contact with the at least two second transparent sensing pads; and the at least two first patterned assistant electrodes are electrically isolated from the at least two second patterned assistant electrodes. Finally, a black matrix is formed on the side of the transparent substrate facing the thin film transistor substrate to cover the first transparent sensing pads, the second transparent sensing pads, the first patterned assistant electrodes, the second patterned assistant electrodes, and part of the transparent substrate, wherein the black matrix is formed by insulating materials.

According to another preferred embodiment of the present invention, a color filter touch sensing substrate is disposed corresponding to a thin film transistor substrate, and a display medium layer is disposed between the color filter touch sensing substrate and the thin film transistor substrate. The method of forming the color filter touch sensing substrate comprises the following steps. First, a transparent substrate is provided. Next, a black matrix is formed on a side of the transparent substrate facing the thin film transistor substrate, wherein the black matrix is formed by insulating materials. Then, at least two first patterned assistant electrodes and at least two second patterned assistant electrodes are formed on the side of the transparent substrate facing the thin film transistor substrate, the first patterned assistant electrodes and the second patterned assistant electrodes are disposed correspondingly to part of the black matrix respectively, and the first patterned assistant electrodes are electrically isolated from the second patterned assistant electrodes. Subsequently, a first transparent conductive layer is formed on the side of the transparent substrate facing the thin film transistor substrate to cover the first patterned assistant electrodes, the second patterned assistant electrodes, the black matrix and part of the transparent substrate. After that, the first transparent conductive layer is patterned to form at least two first transparent sensing pads, at least two second transparent sensing pads and at least one first bridge structure, the first bridge structure electrically connecting to the first transparent sensing pads, and the first transparent sensing pads being electrically isolated from the second transparent sensing pads. The first transparent sensing pads are disposed on the first patterned assistant electrodes and on the black matrix, and the second transparent sensing pads are disposed on the second patterned assistant electrodes and on the black matrix. Finally, at least one second bridge structure is formed to electrically connect to the second transparent sensing pads, and the second bridge structure is electrically isolated from the first bridge structure.

According to another preferred embodiment of the present invention, a color filter touch sensing substrate is disposed corresponding to a thin film transistor substrate, and a display medium layer is disposed between the color filter touch sensing substrate and the thin film transistor substrate. The method of forming the color filter touch sensing substrate comprises the following steps. First, a transparent substrate is provided. Then, a black matrix on a side of the transparent substrate facing the thin film transistor substrate is formed, wherein the black matrix is formed by insulating materials. Next, an assistant electrode layer on the side of the transparent substrate facing the thin film transistor substrate is formed to cover the transparent substrate and the black matrix. After that, the assistant electrode layer is patterned to form at least two first patterned assistant electrodes, at least two second patterned assistant electrodes and at least one first bridge structure. The first patterned assistant electrodes and the second patterned assistant electrodes are disposed corresponding to part of the black matrix respectively, and the first patterned assistant electrodes are electrically isolated from the second patterned assistant electrodes. Next, a first transparent conductive layer is formed on the side of the transparent substrate facing the thin film transistor substrate to cover the first patterned assistant electrodes, the second patterned assistant electrodes and the black matrix and part of the transparent substrate. Then, the first transparent conductive layer is patterned to form at least two first transparent sensing pads and at least two second transparent sensing pads and at least one second bridge structure. The first bridge structure electrically connects to the first transparent sensing pads, and the second bridge structure electrically connects to the second transparent sensing pads. The second bridge structure is electrically isolated from the first bridge structure, and the first transparent sensing pads are electrically isolated from the second transparent sensing pads. The first transparent sensing pads are disposed on the first patterned assistant electrodes and on the black matrix, and the second transparent sensing pads are disposed on the second patterned assistant electrodes and on the black matrix.

In the present invention, the patterned assistant electrodes and the transparent sensing pads can be combined to form a stacked structure. Therefore, the equivalent resistance of the touch-sensing structures/elements will be decreased, and the sensitivity of the touch display panel can be increased. Moreover, touch-sensing structures/elements of a touch display panel are integrated to the inner side of the color filter substrate, and therefore, the reliability of the display panel is increased, the variety of the materials is enhanced, the fabrication process is simplified, and the thinning process can be performed on the outer side of the substrate to decrease the size of the touch display panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be detailed below. The preferred embodiments of the present invention are illustrated in the accompanying drawings with numbered elements.

Figure 1:
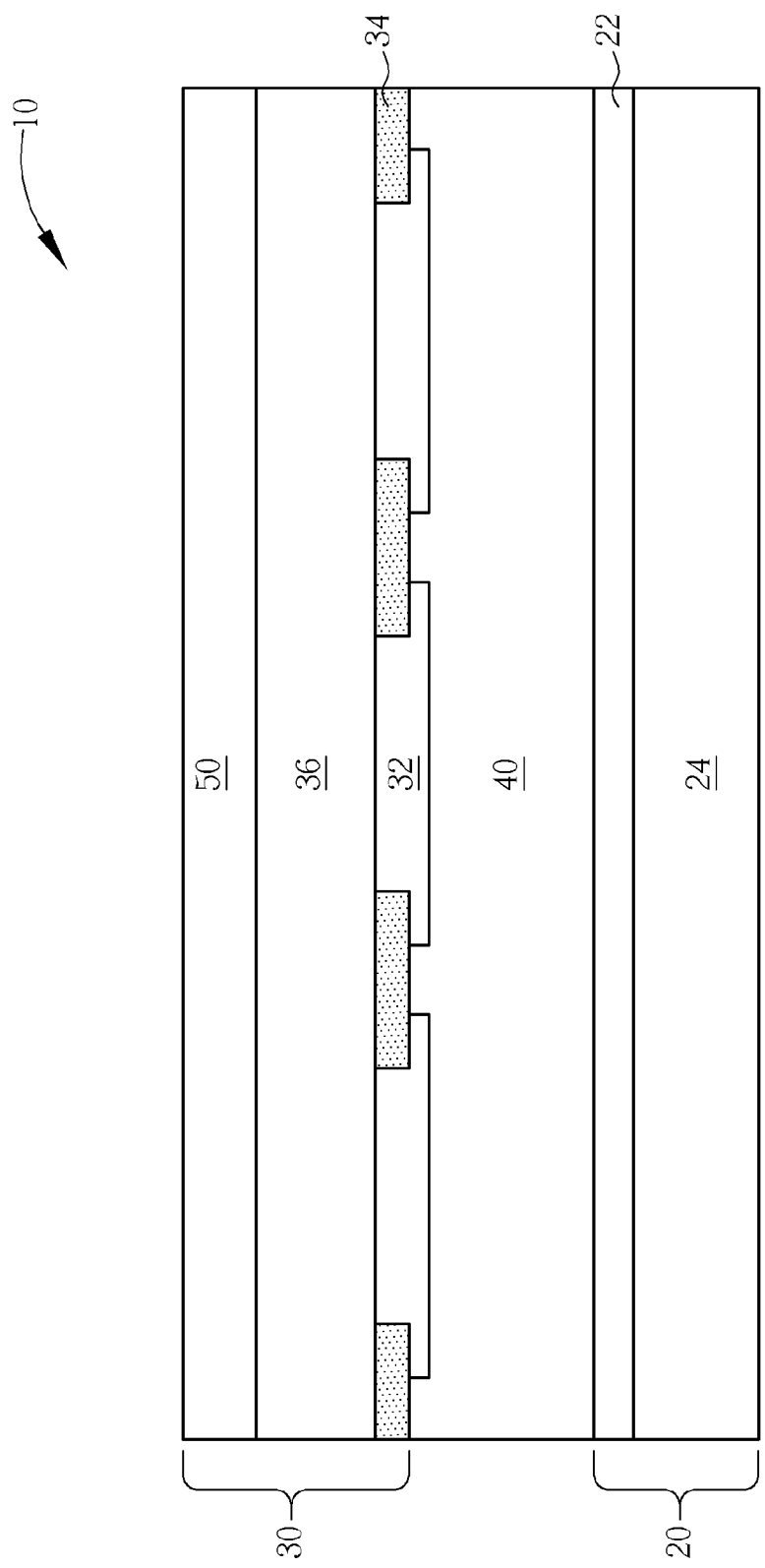
FIG. 1 shows a schematic diagram of a capacitive touch display panel according to prior art.
Figure 2:
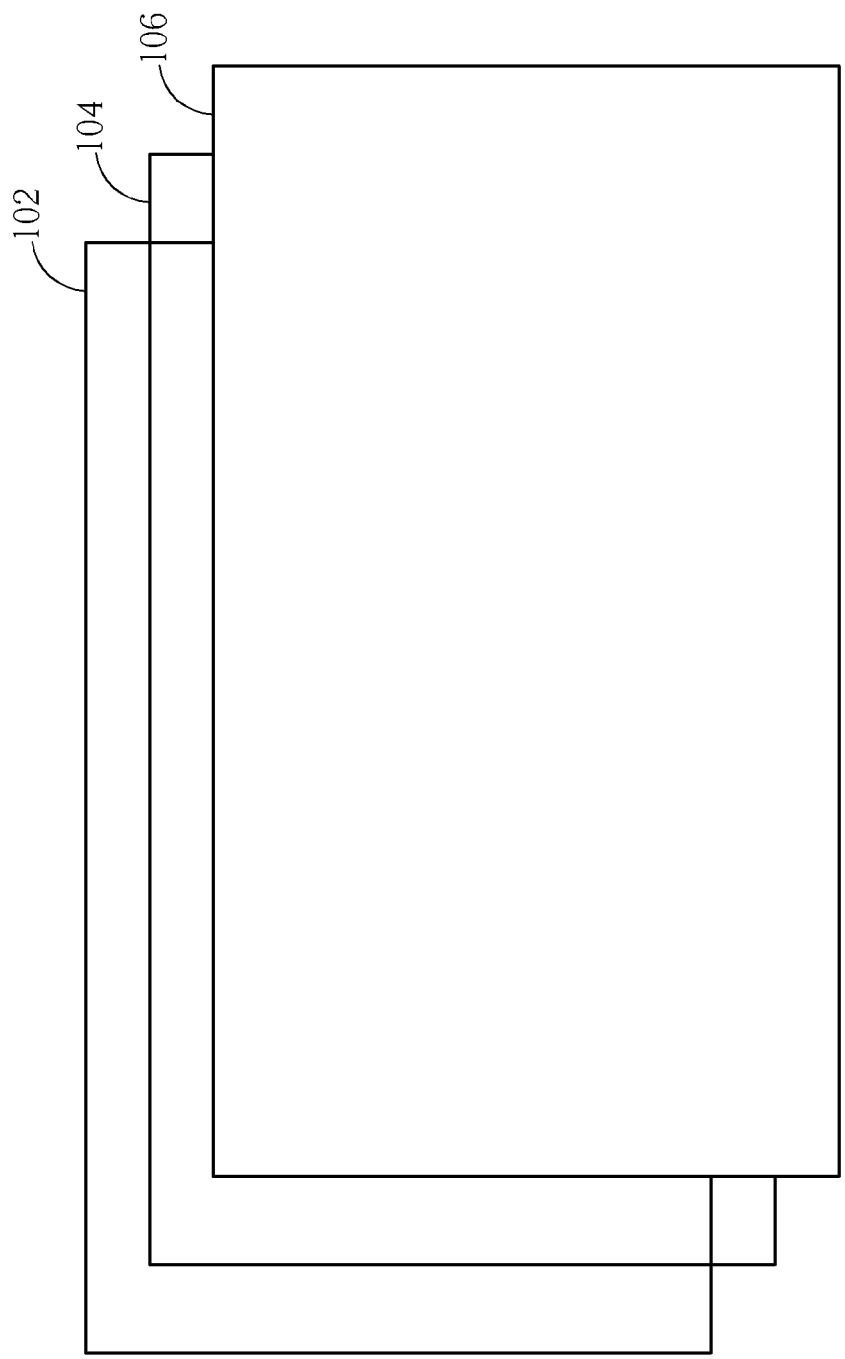
FIG. 2 to FIG. 8 schematically illustrate a method of forming a color filter touch sensing substrate according to a first preferred embodiment of the present invention.
Figure 6:
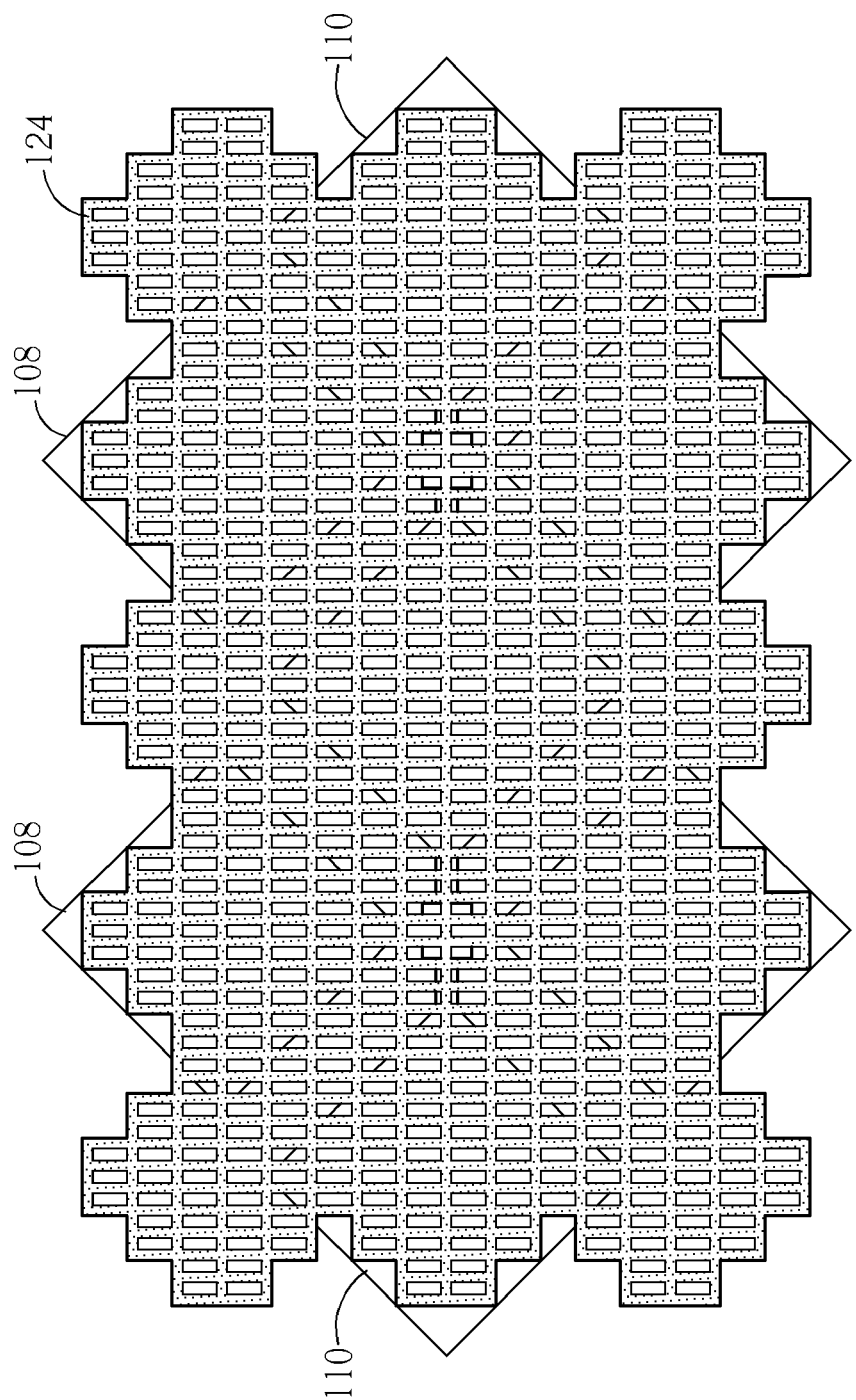
Figure 7:
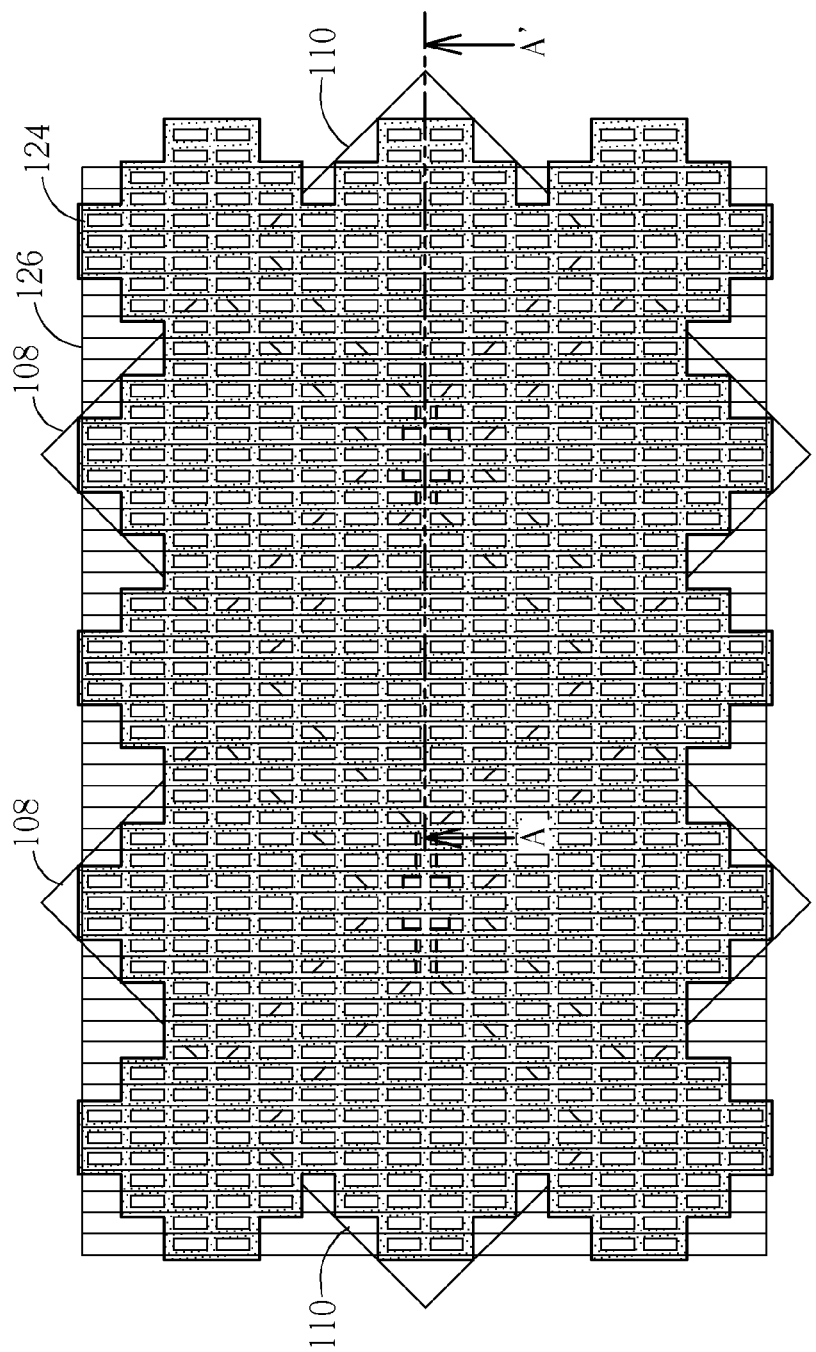
Figure 8:
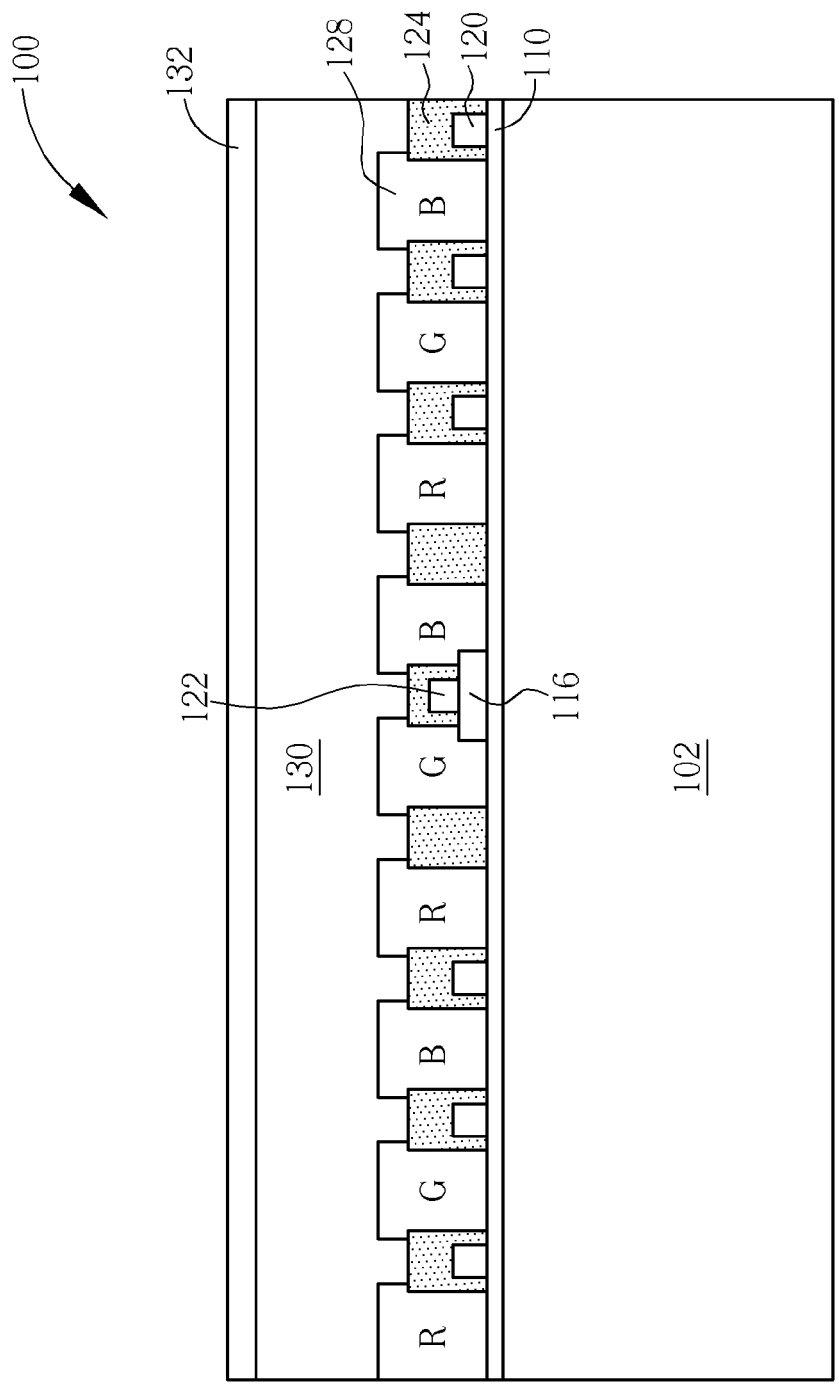

FIG. 2 to FIG. 8 schematically illustrate a method of forming a color filter touch sensing substrate according to a first preferred embodiment of the present invention. FIG. 2 is an exploded diagram illustrating elements of the color filter touch sensing substrate. FIG. 3 to FIG. 7 are schematic top views illustrating the color filter touch sensing substrate. FIG. 8 is a schematic cross-sectional view illustrating the color filter touch sensing substrate 100 along a cross-section line A-A' in FIG. 7. Like numbered numerals designate similar or the same parts, regions or elements. It is to be understood that the drawings are not drawn to scale and are only for illustration purposes. As shown in FIG. 2, a transparent substrate 102 is provided. The transparent substrate 102 can include inorganic materials or organic materials, such as glass, quartz, plastics, resin, acrylic resin, other suitable materials or combinations thereof, but is not limited to these materials. This embodiment utilizes inorganic glass as example. Then, a first transparent conductive layer 104 and an assistant electrode layer 106 are formed sequentially on the inner side (the side facing the inner side of the TFT substrate (numeral 150) in FIG. 9, such as the side facing the surface of array layer 154 of the TFT substrate (numeral 150) in FIG. 9) of the transparent substrate 102. The first transparent conductive layer 104 may be a signal layer or multiple structures, and the material of making the first transparent conductive layer 104 includes indium tin oxide (ITO), aluminum zinc oxide (AZO), indium tin zinc oxide (ITZO), zinc oxide, indium zinc oxide (IZO), cadmium oxide, hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO) or other transparent conductive materials. The assistant electrode layer 106 may be a signal layer or multiple structures, and the material of making assistant electrode layer 106 includes any material with good conductivity: preferably, materials with conductivity better than that of the materials of making the first transparent conductive layer 104. The assistant electrode layer 106 of the preferred embodiment primarily includes opaque conductive materials, such as gold, silver, copper, aluminum, molybdenum, titanium, tantalum, cadmium, nitrides thereof, oxides thereof, alloys thereof, or combinations thereof, but not limited to these materials. The assistant electrode layer 106 can also be constituted by the same material as the first transparent conductive layer 104, or be constituted by the above-mentioned opaque conductive materials and transparent materials.

Figure 3:
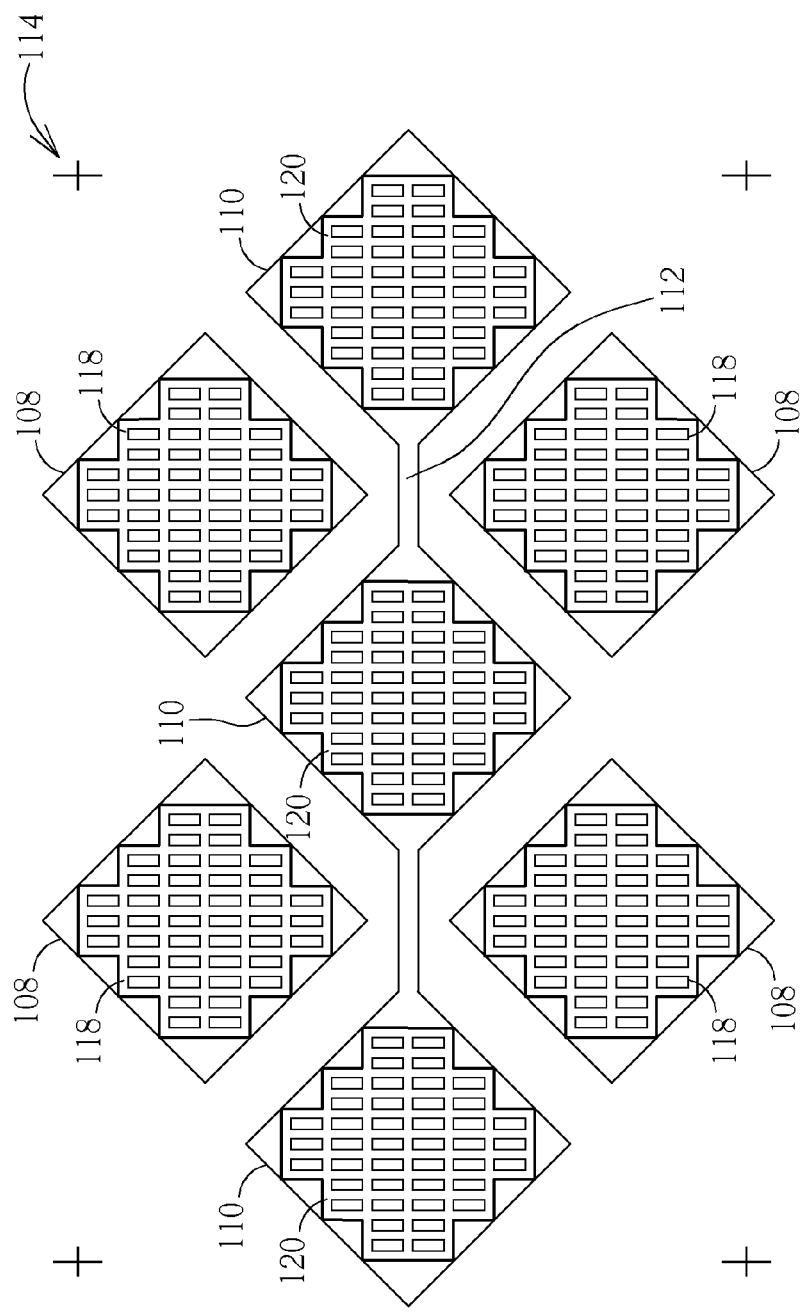

As shown in FIG. 3, the first transparent conductive layer 104 and the assistant electrode layer 106 are patterned. The first transparent conductive layer 104 after patterning forms at least two first transparent sensing pads 108 and at least two second transparent sensing pads 110. The assistant electrode layer 106 after patterning forms at least two first patterned assistant electrodes 118, and at least two second patterned assistant electrodes 120. The first patterned assistant electrodes 118 electrically connect to and contact with the first transparent sensing pads 108, and the second patterned assistant electrodes 120 electrically connect to and contact with the second transparent sensing pads 110. The first transparent sensing pads 108 are electrically isolated (such as electrically insulated, insulated, or isolated) from the second transparent sensing pads 110. The first patterned assistant electrodes 118 are electrically isolated (such as electrically insulated, insulated, or isolated) from the second patterned assistant electrodes 120. Four first transparent sensing pads 108, and three second transparent sensing pads 110 are exemplified in the present embodiment. Accordingly, four first patterned assistant electrodes 118 are shown corresponding to the four first transparent sensing pads 108, and three second patterned assistant electrodes 120 are shown corresponding to the three second transparent sensing pads 110 in the present embodiment, but the invention is not limited to these embodiments. In the present invention, N first transparent sensing pads 108, M second transparent sensing pads 110, O first patterned assistant electrodes 118, and P second patterned assistant electrodes 120 can be formed on the transparent substrate 102, wherein N, M, O, P are integers greater than 1, and $N \geq O$, $M \geq P$, and $N \geq M$. For a better product symmetry, and sensing uniformity, N, M, O, P are preferably equal to each other, but not limited to this. For example, the first patterned assistant electrodes 118 and the second patterned assistant electrodes 120 can be disposed on all of the first transparent sensing pads 108 and the second transparent sensing pads 110, or only on part of the first transparent sensing pads 108 and the second transparent sensing pads 110 to emphasize sensitivity in certain regions.

The above-mentioned step of patterning the first transparent conductive layer 104 and the assistant electrode layer 106 can be performed by exposing the first and second patterned assistant electrodes 118, 120 and the first and the second transparent sensing pads 108, 110 simultaneously by a graytone mask to simplify the fabricating process. Alternatively, at least two pattern transferring steps can also be utilized to etch the first and second patterned assistant electrodes 118, 120 and the first and the second transparent sensing pads 108, 110 separately.

For example, the step of patterning the first transparent conductive layer 104 and the assistant electrode layer 106 can include: first, forming a photoresist layer (not shown) on the assistant electrode layer 106 entirely. Then, an exposure process is performed to pattern the photoresist layer to a patterned photoresist layer (not shown) by a graytone mask, a halftone mask, or a phase shift mask. Furthermore, the patterned photoresist layer has at least two thicknesses. The thicker region of the patterned photoresist layer may have the patterns of the first and second patterned assistant electrodes 118, 120, and the thinner region of the patterned photoresist layer may have the patterns of the first and the second transparent sensing pads 108, 110. Moreover, part of the assistant electrode layer 106 can be exposed through the patterned photoresist layer, and the first transparent conductive layer 104 under the exposing region and part of the exposed assistant electrode layer 106 can be removed in the following process. After that, the first transparent conductive layer 104 and the assistant electrode layer 106 are etched by taking the patterned photoresist layer as an etch mask to form the first and second patterned assistant electrodes 118, 120 and the first and the second transparent sensing pads 108, 110. Next, the patterned photoresist layer is removed, and after-etch processes such as rinsing and drying are performed. The process of etching the first transparent conductive layer 104 and the assistant electrode layer 106 can be performed by only one anisotropic etching tool, or in different etching tools.

In addition, the above-mentioned graytone mask can be replaced by performing a plurality of exposure processes by using a plurality of masks and a plurality of photoresist layers. For example, first, a photoresist layer (not shown) is formed on the assistant electrode layer 106 entirely. Next, a patterned photoresist layer with the patterns of first and second patterned assistant electrodes 118, 120 is formed by performing an exposure process with a mask. Then, the patterns of the first and second patterned assistant electrodes 118, 120 on the patterned photoresist layer is transferred onto the assistant electrode layer 106 to form the first and second patterned assistant electrodes 118, 120 by an etch process and the patterned photoresist layer is removed. Then another patterned photoresist layer with the patterns of the first and the second transparent sensing pads 108, 110 is formed by performing an exposure process with another mask. Then, the patterns of the first and the second transparent sensing pads 108, 110 on the patterned photoresist layer are transferred onto the first transparent conductive layer 104 to form the first and the second transparent sensing pads 108, 110 by an etch process, and the another patterned photoresist layer is removed. Alternatively, the fabrication sequence can be changed to the following: first, a patterned photoresist layer with patterns of the first and the second transparent sensing pads 108, 110 can be formed. Then, the patterns of the first and the second transparent sensing pads 108, 110 can be transferred onto the assistant electrode layer 106 and the first transparent conductive layer 104 by an etch process, and the patterned photoresist layer is removed. After that, another patterned photoresist layer is formed on the patterned assistant electrode layer 106 to form the first and second patterned assistant electrodes 118, 120 on the first and the second transparent sensing pads 108, 110, and the another patterned photoresist layer is removed.

The assistant electrode layer 106 and the first transparent conductive layer 104 are etched simultaneously, therefore, they can be rinsed and dried together to simplify the fabricating process. On the other hand, when using the graytone mask to form patterns of the first and second patterned assistant electrodes 118, 120 and patterns of the first and the second transparent sensing pads 108, 110, the steps of photoresist formation, exposure, and photoresist remove can be reduced to simply the complexity of the fabricating process.

In the above-mentioned steps, the assistant electrode layer 106 and the first transparent conductive layer 104 are non-photosensitive materials. Therefore, a photoresist is needed to transfer patterns. In another preferred embodiment of the present invention, the assistant electrode layer 106 and the first transparent conductive layer 104 can include photosensitive materials, such as light-polymerized or light-cracked materials. Then, the assistant electrode layer 106 and the first transparent conductive layer 104 can be exposed to form patterns without any photoresist layer. The photosensitive conductive materials are a mixture such as a mixture containing more organic photosensitive materials and less conductive materials measured in volume percentage, but not limited to this. The organic photosensitive materials can be made from single or multiple materials, and the organic photosensitive materials can include photoresists, enzocyclobutane (BCB), cycloolefin, polyimide, polyamide, polyester, polyalcohol, poly(ethylene oxide), polyphenylene, resins, polyether, polyketone, other suitable materials, derivatives thereof, or combinations thereof. The conductive materials may include single or multiple materials, and the conductive materials include the above-mentioned opaque conductive materials, transparent materials or combinations thereof. Furthermore, in the present invention, initially, the first transparent conductive layer 104 can be formed entirely. Then, the first transparent conductive layer 104 is etched to form the first and the second transparent sensing pads 108, 110. After that, the assistant electrode layer 106 is formed entirely, and the assistant electrode layer 106 is etched to form the first and second patterned assistant electrodes 118, 120.

As shown in FIG. 3, in a better situation, the step of patterning the first transparent conductive layer 104 and the assistant electrode layer 106 also includes forming at least one first bridge structure 112 disposed between the first transparent sensing pads 108 so as to electrically connect the first transparent sensing pads 108 to each other. Please refer to FIG. 3. The above-mentioned at least one first bridge structure 112 refers to a single wide piece. At least two separated thin pieces can also be used in place of the single wide piece to avoid defects in the first bridge structure and increase reliability. The first bridge structure 112 is preferably formed by the patterned first transparent conductive layer 104 (as shown in FIG. 3), or can be formed by the patterned assistant electrode layer 106, or can be formed by the patterned first transparent conductive layer 104 and the patterned assistant electrode layer 106 together. In other preferred embodiments, the first bridge structure 112 can also include structures other than the first transparent conductive layer 104 and the assistant electrode layer 106: for example, before or after forming the first transparent sensing pads 108 and the first patterned assistant electrodes 118, forming the first bridge structure 112 to cross and electrically connect the first transparent sensing pads 108 by other materials.

In addition, in another preferred situation, the step of patterning the first transparent conductive layer 104, and the assistant electrode layer 106 also includes forming at least one alignment mark 114 as shown in FIG. 3, but is not limited to this. The alignment mark 114 preferably includes opaque materials so as to assist alignments in the following processes. For example, the alignment mark 114 can be formed by the assistant electrode layer 106, and the assistant electrode layer 106 is made of opaque conductive materials, but not limited to this. In other preferred embodiments, the alignment mark 114 can also be formed by the first transparent conductive layer 104. In this way, the alignment mark 114 is detected by chromatism between the transparent substrate 102 and the first transparent conductive layer 104. Moreover, the alignment mark 114 can also include the patterned first transparent conductive layer 104 and the patterned assistant electrode layer 106 simultaneously.

Figure 4:
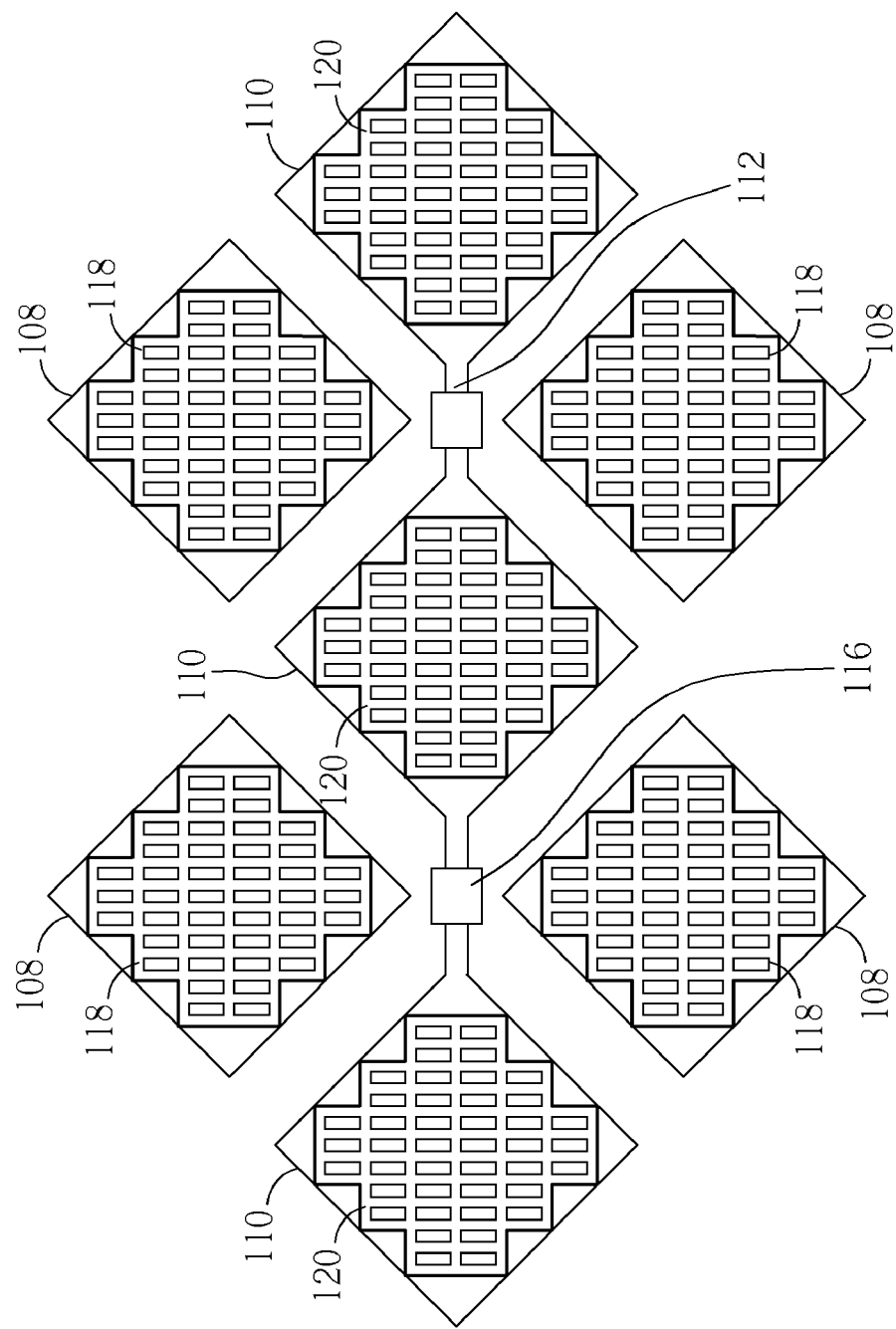
Figure 5:
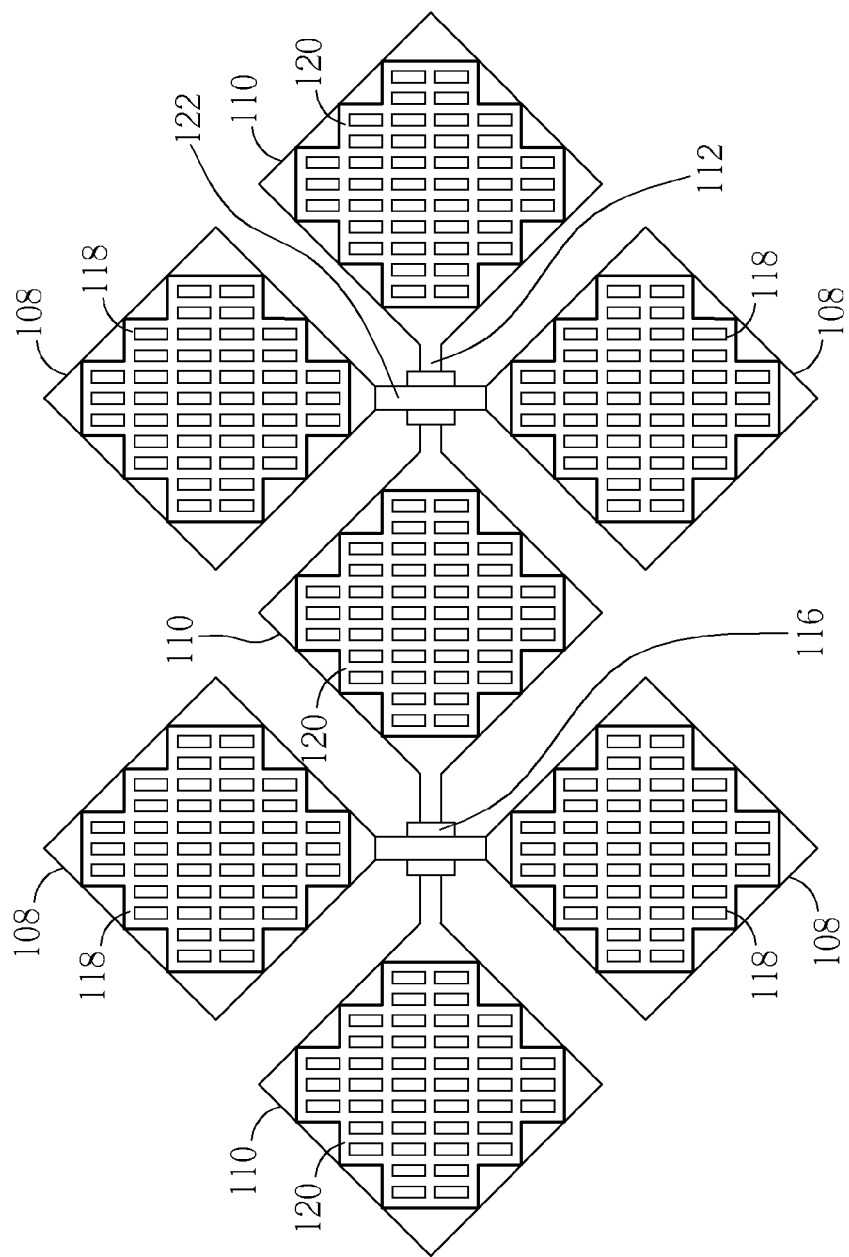

As shown in FIG. 4, at least one patterned insulating layer 116 is formed optionally on the first bridge structure 112, after the formation of the patterned first transparent conductive layer 104 and the patterned assistant electrode layer 106. As shown in FIG. 5, at least one second bridge structure 122 is formed on the patterned insulating layer 116. The patterned insulating layer 116 is for electrically isolating (electrically insulating, insulating, or isolating) the first bridge structure 112 and the second bridge structure 122, and the patterned insulating layer 116 does not cover the first and second patterned assistant electrodes 118, 120, and the first and the second transparent sensing pads 108, 110. The second bridge structure 122 crosses the patterned insulating layer 116 and is disposed between the second transparent sensing pads 110 to electrically connect the second transparent sensing pads 110. The second bridge structure 122 may be single film or multiple films, and includes any conductive materials, such as materials used in the first transparent conductive layer 104 and/or the patterned assistant electrode layer 106. The patterned insulating layer 116 and the second bridge structure 122 can be formed by the deposition process and the pattern transferring process, where details of the process are omitted here. In a better situation, the patterned insulating layer 116 and the second bridge structure 122 can be formed by a single layer or multiple layers of transparent materials to provide better transmittance, but not limited to this. The material of making the patterned insulating layer 116 includes inorganic materials (i.e. silicon oxide, silicon nitride, silicon oxy-nitride, silicon carbide, hafnium oxide, aluminium oxide, other material or combinations thereof), organic materials (i.e. photoresist, enzocyclobutane, cycloolefin, polyimide, polyamide, polyester, polyalcohol, poly(ethylene oxide), polyphenylene, resins, polyether, polyketone, other suitable materials, derivatives thereof, or combinations thereof), or a combination of inorganic and organic materials. The material of forming the second bridge structure 122 may include the above-mentioned opaque conductive materials, transparent conductive materials, derivatives thereof, or combinations thereof. When the patterned insulating layer 116 and the second bridge structure 122 occupy a smaller area, for example, the patterned insulating layer 116 and the second bridge structure 122 can be blocked (such as shielding, hiding, covered, or other same meanings) completely by the black matrix formed in the following process, or the patterned insulating layer 116 and the second bridge structure 122 do not cover any image-display area in the pixel of the panel, the patterned insulating layer 116 and/or the second bridge structure 122 may also include opaque materials, wherein the second bridge structure 122 uses the above-mentioned opaque conductive materials. The opaque material that the patterned insulating layer 116 uses includes a mixture of the above-mentioned transparent materials for the transparent patterned insulating layer 116 and dyes, or includes other materials with opaque characteristics. Furthermore, as shown in FIG. 5, the at least one second bridge structure 122 refers to a single wide piece. At least two separated thin pieces can also be used to avoid defects (such as cracked line or open line) in the second bridge structure and increase reliability.

As shown in FIG. 6, a black matrix 124 is formed on the side (inner side) of the transparent substrate 102 facing the thin film transistor substrate to cover the first transparent sensing pads 108, the second transparent sensing pads 110, the first patterned assistant electrodes 118, the second patterned assistant electrodes 120 and part of the transparent substrate 102. The black matrix 124 may be a single layer or multiple layers, and the material of making the black matrix 124 is insulating materials used to prevent shorts occurring between each of the pads and each of the electrodes, where the black matrix 124 does not have any operational function. To see from the top view, the black matrix 124 can cover the first patterned assistant electrodes 118, and the second patterned assistant electrodes 120 completely. More particularly, part of the first and the second patterned assistant electrodes 118, 120 include a grid pattern consisting of a plurality of conductive strips. The black matrix 124 comprises a grid pattern consisting of a plurality of strip regions, wherein the width of each of the conductive strips of the first and the second patterned assistant electrodes 118, 120 is substantially 6 micrometers smaller than that of each of the strip regions of the black matrix 124 as a example, but not limited to this size.

As shown in FIG. 7 and FIG. 8, a plurality of color filters 128 and a second transparent conductive layer 132 are formed on the black matrix 124 sequentially, wherein the second transparent conductive layer 132 may be formed on the color filters 128 conformally with the similar profile or shape. That is, the black matrix 124 has the same topography as the color filters 128 without a planarized layer (planarization layer). However, to provide surface evenness and to form a uniform electric field, a planarized layer 130 is formed between the color filters 128 and the second transparent conductive layer 132 in another preferred embodiment. That is, the color filters 128, the planarized layer 130 (planarization layer), and the second transparent conductive layer 132 are formed sequentially on the black matrix 124, as shown in FIG. 8. In addition, to show clearly the comparative position between the other elements mentioned above and the color filters 128, the planarized layer 130 (planarization layer), and the second transparent conductive layer 132, the color filters 128, the planarized layer 130 (planarization layer), and the second transparent conductive layer 132 are not drawn in FIG. 7 individually. Instead, the color filters 128, the planarized layer 130 (planarization layer), and the second transparent conductive layer 132 are combined as a stacked display element 126 in FIG. 7 shown in a perspective way. The color filters may include a red color filter R, a green color filter G, a blue color filter B, a white color filter (designated with W and not shown in figures), other color filters with suitable colors in chromaticity coordinate, or at least two color filters mentioned above, but not limited to these. The thickness of each of the color filters is substantially equal to 3 micrometers, but is not limited to this thickness. The second transparent conductive layer 132 may be single layer or multiple layers. The material of making the second transparent conductive layer 132 includes the transparent conductive materials for the first transparent conductive layer 104, and the second transparent conductive layer 132 may serve as the common electrode of the color filter touch sensing substrate 100. The thickness of the planarized layer 130 (planarization layer) is about 3 micrometers, but not limited to this thickness. The planarized layer 130 (planarization layer) is for providing a planarized surface to make the second transparent conductive layer 132 formed in the following step have a planarized structure. The planarized layer 130 (planarization layer) may be inorganic materials (for example, silicon oxide, silicon nitride, silicon oxy-nitride, silicon carbide, hafnium oxide, aluminum oxide, other material or combinations thereof), or organic materials (for example, photoresists, enzocyclobutane (BCB), cycloolefin, polyimide, polyamide, polyester, polyalcohol, poly(ethylene oxide), polyphenylene, resins, polyether, polyketone, other suitable materials, derivatives thereof, or combinations thereof), preferred, all of the above-mentioned materials of the planarized layer 130 comprises insulating materials. The fabricating method of the color filter touch sensing substrate can further include other fabrication steps such as formation of an alignment layer or bumps.

Figure 9:
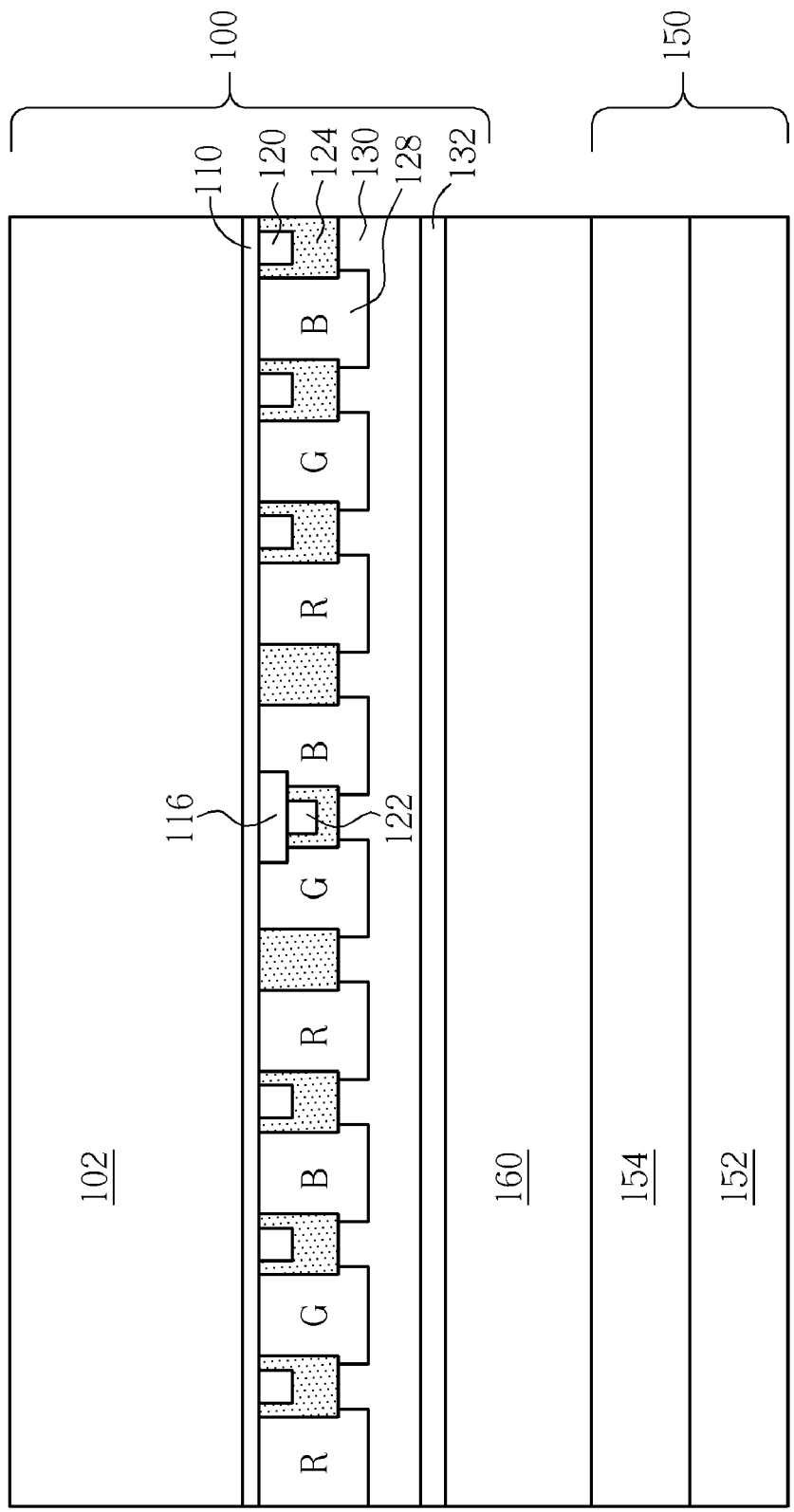
FIG. 9 schematically illustrates a method of forming a touch display panel in accordance with a preferred embodiment of the present invention.

FIG. 9 schematically illustrates a method of forming a touch panel in accordance with a preferred embodiment of the present invention. As shown in FIG. 9, a color filter touch sensing substrate 100 is formed by the method illustrated in FIG. 2 to FIG. 8. Then, the color filter touch sensing substrate 100 and the thin film transistor substrate 150 are assembled. A display medium layer 160 is disposed between the color filter touch sensing substrate 100 and the thin film transistor substrate 150. Next, the touch display panel is formed after a panel-cutting process (not shown) and a polarizer-attaching process (not shown). The color filter touch sensing substrate 100 is disposed corresponding to the thin film transistor substrate 150, where the first and the second patterned assistant electrodes 118, 120, the first and the second transparent sensing pads 108, 110, the black matrix 124, the color filters 128, the second transparent conductive layer 132 and the optionally formed planarized layer 130 (planarization layer) are disposed on the inner side, i.e. the side facing the thin film transistor substrate 150, of the color filter touch sensing substrate 100. The thin film transistor substrate 150 includes a substrate 152 and an array layer 154. The array layer 154 includes pixel structures arranged in array. The pixel structures (not shown) include TFTs, pixel electrodes electrically connecting to the drains of the TFTs, scan lines electrically connecting to gates of the TFTs and data lines electrically connecting to sources of the TFTs. The substrate 152 can use the same material that the transparent substrate 102 uses, or other opaque materials such as wafer, ceramics, other suitable materials, or combinations thereof. The TFTs are used to control each of the pixel structures for display. The TFTs include bottom gate TFTs, top gate TFTs or other suitable types. The display medium layer 160 includes non-light-emitting materials, light-emitting organic materials, light-emitting inorganic materials, or combinations thereof. The display medium layer 160 in the present invention uses non-light-emitting materials, such as a liquid crystal material, as an example. In other embodiments, the display medium layer 160 includes plasma, fluorescent materials, phosphorescent materials, light-emitting diodes, and organic light-emitting diodes. Even fluorescence coated on the pixel structures in vacuum environment can be used as the display medium layer 160. The touch display panel can be a liquid crystal display panel (for example, a transflective liquid crystal display panel, a transmissive micro reflective display panel, a reflective display panel, a vertical alignment (VA) display panel, an in-plane switching (IPS) display panel, a multi domain vertical alignment (MVA) liquid crystal display, a twisted nematic (TN) display panel, a super twisted nematic (STN) display panel, a patterned vertical alignment (PVA) display panel, a super patterned vertical alignment (S-PVA) display panel, an advanced super view (ASV) display panel, a fringe field switching (FFS) display panel, a continuous pinwheel alignment (CPA) display panel, an axially symmetric aligned microcell (ASM) display panel, an optically compensated birefringence (OCB) display panel, a super in-plane switching (S-IPS) display panel, an advanced super in-plane switching (AS-IPS) display panel, an ultra fringe-field switching (UFFS) display panel, a polymer stabilized alignment (PSA) display panel, a dual-view display panel, a triple-view display panel, a three-dimensional display panel, a multi-panel, or other display panels), a top emission OLED/LED display panel, a bottom emission OLED/LED display panel, a dual emission OLED/LED display panel, electrophoretic display (EPD), blue phase display, or a plasma display panel.

In the present invention, the transparent sensing pads are integrated on a side (inner side) of the color filter substrate facing the TFT substrate to form an in-cell touch panel. Users can touch the outer side (the side opposite to the thin film transistor substrate) of the color filter touch sensing substrate with fingers or touch pens within electric to induce the capacitance variation of sensing pads. There is no touch element disposed on the outer side of the color filter touch sensing substrate, and then a sensing signal can be generated. The sensing signal will be sent to signal processing circuits to locate the touched region.

Figure 10:
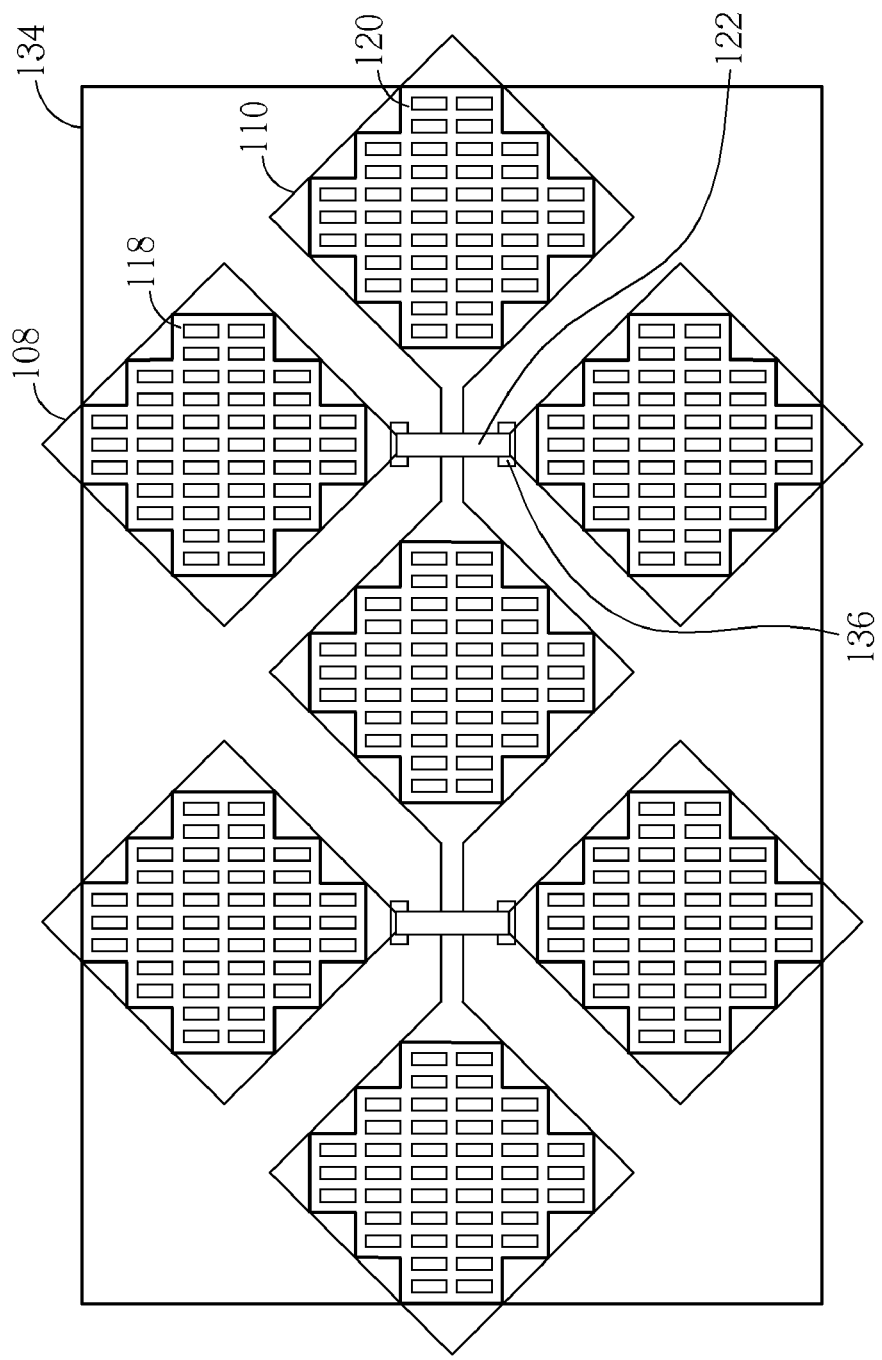
FIG. 10 schematically illustrates a method of forming a color filter touch sensing substrate according to a second preferred embodiment of the present invention.

FIG. 10 schematically illustrates a method of forming a color filter touch sensing substrate according to a second preferred embodiment of the present invention. The second preferred embodiment is a variation of the first preferred embodiment. The difference between the first and the second preferred embodiment is that, in the second preferred embodiment, the first bridge structure 112 and the second bridge structure 122 are electrically isolated (electrically insulated, isolated, or insulated) by the insulating layer 134 (can also be called the patterned insulating layer) with openings 136, and the insulating layer 134 covers the first and the second patterned assistant electrodes 118, 120, the first and the second transparent sensing pads 108, 110, and the first bridge structure 112. As shown in FIG. 10, first, steps similar to those shown in FIG. 2 to FIG. 3 are performed as follows: a transparent substrate 102 is provided. At least two first transparent sensing pads 108, at least two second transparent sensing pads 110, at least two first patterned assistant electrodes 118 and at least two second patterned assistant electrodes 120 are formed. Then, an insulating layer 134 (also called a patterned insulating layer) is formed to cover the first transparent sensing pads 108, the second transparent sensing pads 110, the first bridge structure 112, the first patterned assistant electrodes 118 and the second patterned assistant electrodes 120. Part of the second transparent sensing pads 110 are exposed through a plurality of openings 136 on the insulating layer 134. The insulating layer 134 may have materials, number of films or other related details described for the patterned insulating layer 116; further description is omitted here for brevity. Preferably, the insulating layer 134 is primarily formed by transparent insulating materials to provide better transmittance, but is not limited to this embodiment. Next, at least one second bridge structure 122 is formed. The second structure 122 electrically connects to the adjacent two second transparent sensing pads 110 through the openings 136 of the insulating layer 134. After that, a black matrix 124, color filters 128, the second transparent conductive layer 132 and optionally-formed planarized layer 130 (planarization layer) are formed by the fabricating steps illustrated in FIG. 6 to FIG. 7. Now, the color filter touch sensing substrate (not shown) of this embodiment is complete. In addition, part of each second transparent sensing pad 110 is exposed by the individual opening 136 in this embodiment, but is not limited to this. In other preferred embodiments, the number of the openings 136 exposing part of each of the second transparent sensing pads can be increased to a number above two, to enhance the reliability of the second structure 122 and prevent defects from occurring in the second structure. Moreover, the shape of the opening 136 is not limited.

Figure 11:
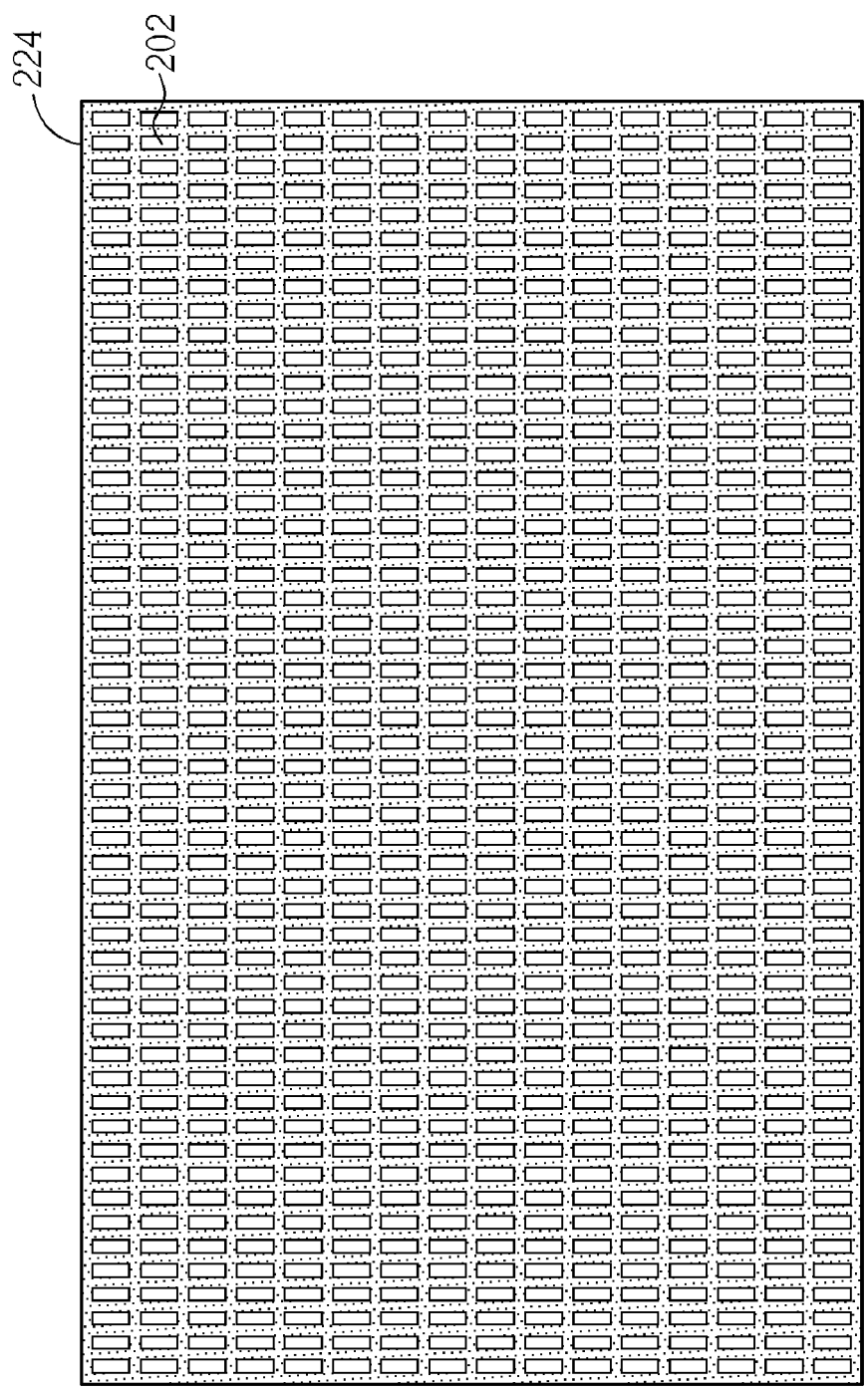
FIG. 11 to FIG. 16 schematically illustrate a method of forming a color filter touch sensing substrate according to a third preferred embodiment of the present invention.
Figure 15:
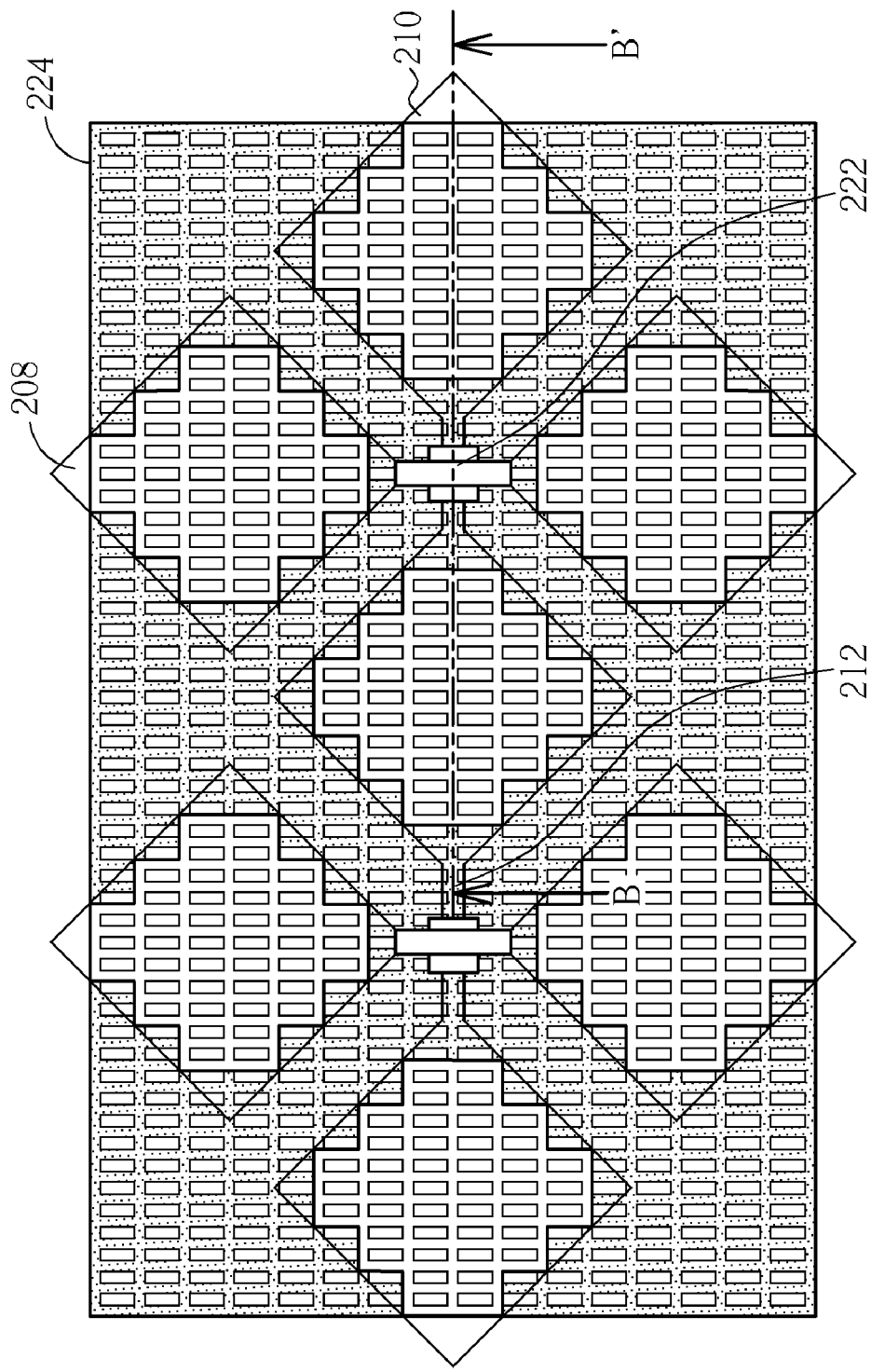
Figure 16:
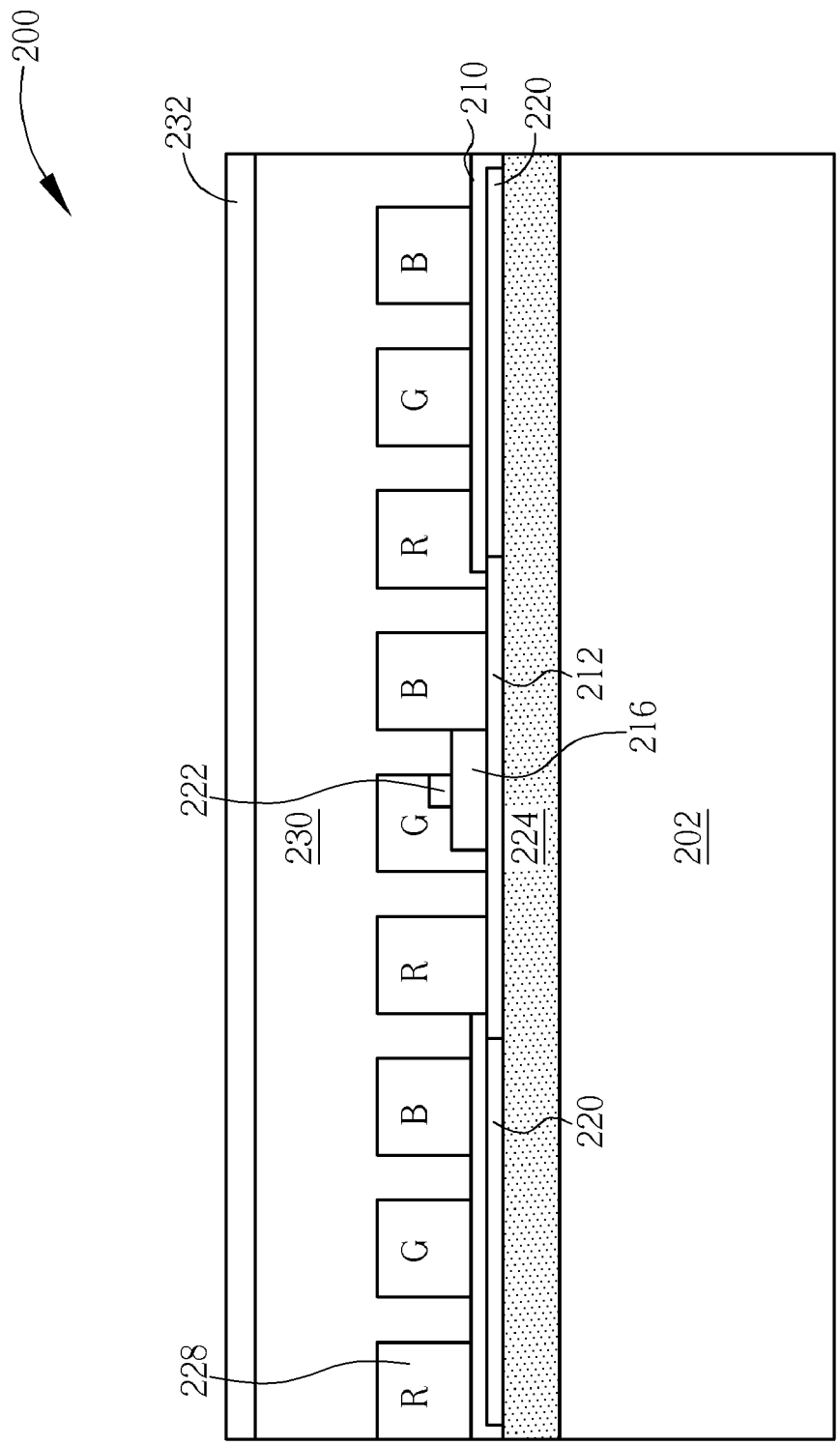

The fabricating steps are not limited to the above-mentioned embodiments; for example, the black matrix and the patterned assistant electrode can be formed before the transparent sensing pad. FIG. 11 to FIG. 16 schematically illustrate a method of forming a color filter touch sensing substrate 200 according to a third preferred embodiment of the present invention. FIG. 11 to FIG. 15 are schematic top views illustrating the color filter touch sensing substrate 200. FIG. 16 is a schematic cross-sectional view illustrating the color filter touch sensing substrate 200 along a cross-section line B-B' in FIG. 15. The materials, number of layers, numbers, usage or other related details of elements (structures) illustrated in the present embodiment, can be determined by referring to the description described in FIG. 2 to FIG. 7. As shown in FIG. 11, a transparent substrate 202 is provided, wherein the transparent substrate 202 may use the materials that the transparent substrate 102 illustrated in FIG. 2 uses. Then, a black matrix 224 having an insulating characteristic is formed on a side (inner side) of the transparent substrate 202 facing the thin film transistor substrate. The materials, number of layers, numbers, usage or other related details of the black matrix 224 can be determined by referring to the description describing the black matrix 124 in FIG. 6.

Figure 12:
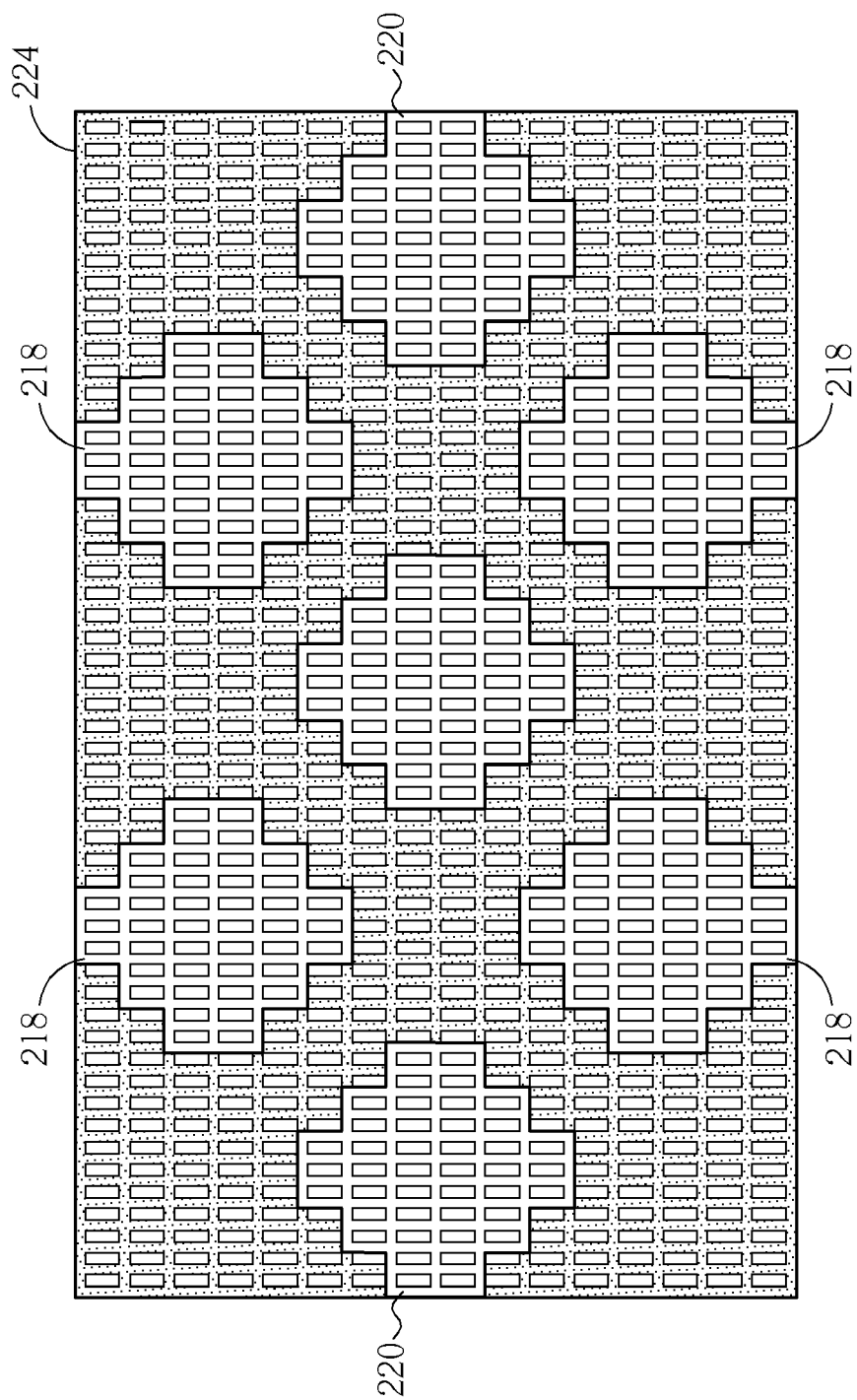

As shown in FIG. 12, at least two first patterned assistant electrodes 218 and at least two second patterned assistant electrodes 220 are formed on the black matrix 224. The first patterned assistant electrodes 218 and the second patterned assistant electrodes 220 are formed corresponding to part of the black matrix 224. Each of the first patterned assistant electrodes 218 is electrically isolated (electrically insulated, isolated, or insulated) from each of the second patterned assistant electrodes 220. To see from a top view, the first and second assistant electrodes 218, 220 are disposed entirely on the corresponding position of the black matrix 224, but do not exceed the black matrix 224. Preferably, the wideness of each of the conductive strips of each the first and second assistant electrodes 218, 220 is substantially 6 micrometers smaller than that of each strip region of the black matrix, but is not limited to this size.

In addition, at least one alignment mark (not shown) can formed during the formation of the first and second assistant electrodes 218, 220, but is not limited to this step. At this point, the alignment mark and the first and second assistant electrodes 218, 220 are formed from the same assistant electrode layer.

Figure 13:
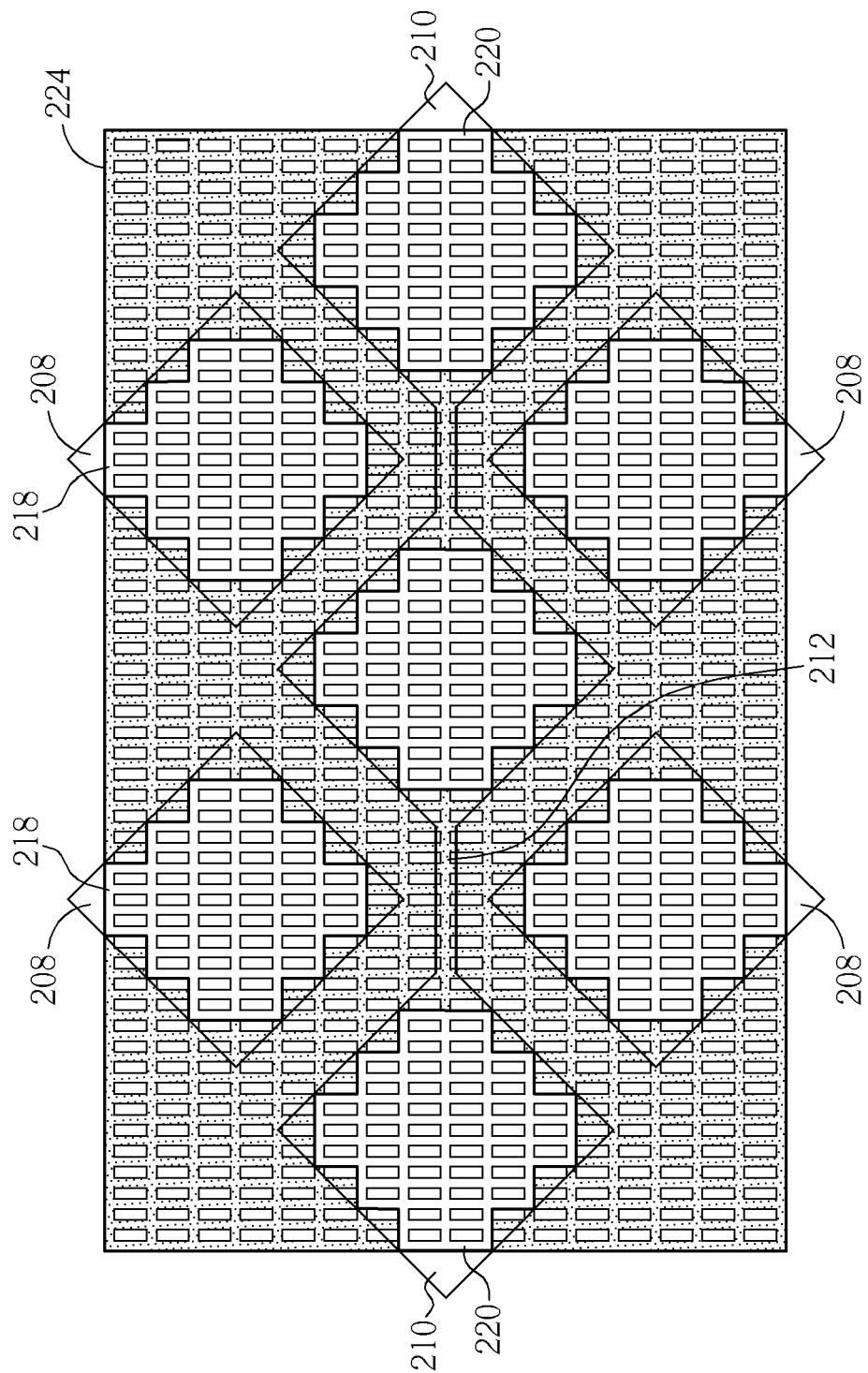

As shown in FIG. 13, a first transparent conductive layer (not shown) is formed entirely on the side of the transparent substrate 202 facing the thin film transistor substrate. Then, the first transparent conductive layer is patterned to form at least two first transparent sensing pads 208, at least two second transparent sensing pads 210 and at least one first bridge structure 212 simultaneously. The first transparent sensing pads 208 are disposed on each of the first assistant electrodes 218 respectively, and also disposed on the black matrix 224. The second transparent sensing pads 210 are disposed on each of the second assistant electrodes 220 respectively, and also disposed on the black matrix 224. The first bridge structure 212 is disposed between the first transparent sensing pads 208 to serve as an electrical connection. The first transparent sensing pads 208 are electrically isolated (electrically insulated, isolated, or insulated) from the second transparent sensing pads 210.

Figure 14:
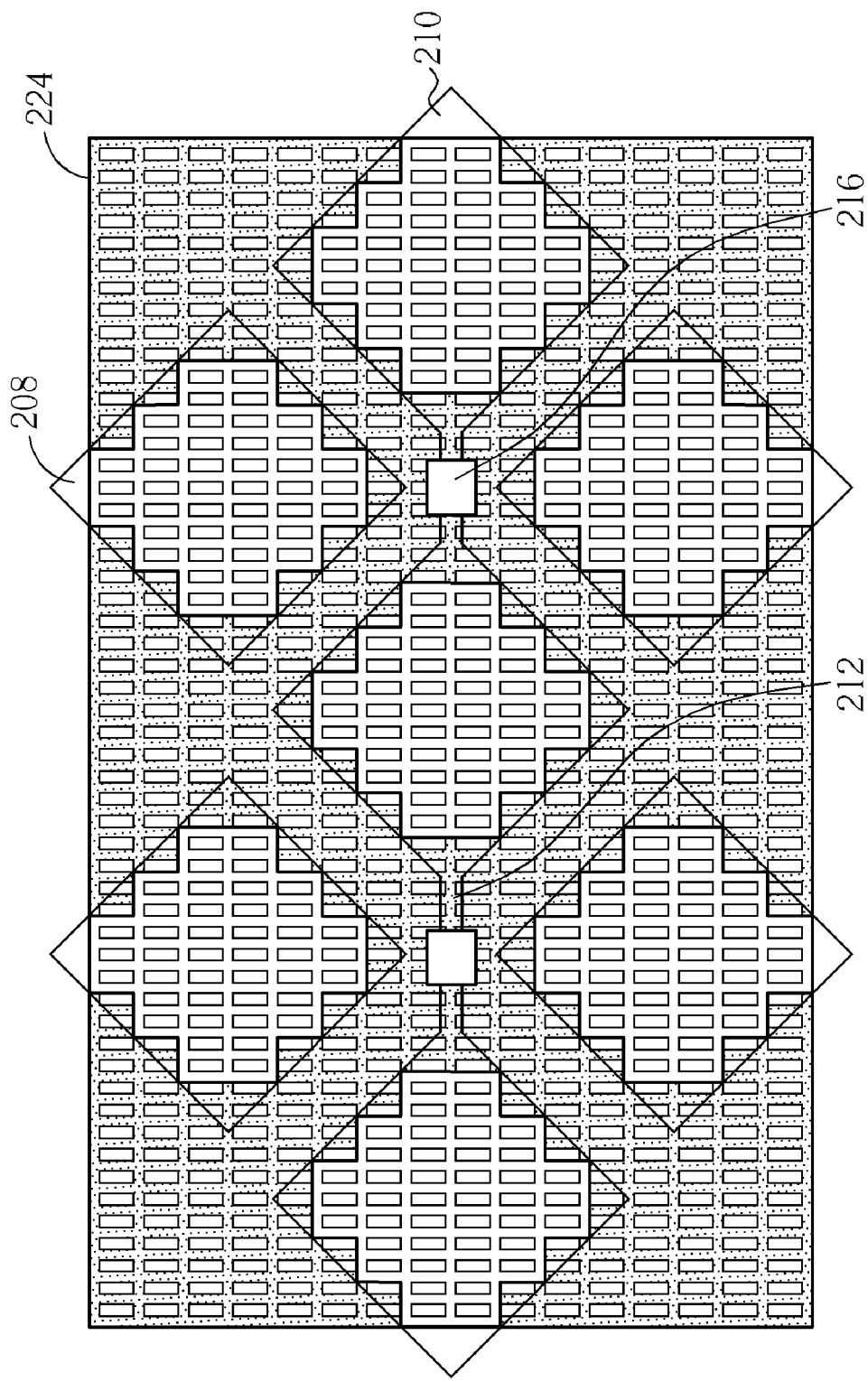

As shown in FIG. 14, at least one patterned insulating layer 216 is formed on the first bridge structure 212. As shown in FIG. 15, at least one second bridge structure 222 is formed on the patterned insulating layer 216. The second bridge structure 222 crosses over the patterned insulating layer 216 and be disposed between the second transparent sensing pads 210 to serve as an electrical connection.

As shown in FIG. 16, a plurality of color filters 228, a second transparent conductive layer 232 and an optional-formed planarized layer 130 (planarization layer) are formed sequentially on the first and second transparent sensing pads 208, 210 to form the color filter touch sensing substrate 200. The detailed description of the optional-formed planarized layer 130 (planarization layer) can be determined by referring to FIG. 7 and FIG. 8. The second transparent conductive layer 232 can be used as a common electrode of the color filter touch sensing substrate 200. After that, the color filter touch sensing substrate 200 can replace the color filter touch sensing substrate 100, and be assembled with the thin film transistor substrate 150 and the display medium layer 160 (not shown in FIG. 16) by the steps illustrated in FIG. 9. The first and second assistant electrodes, the first and second transparent sensing pads, the black matrix, the color filters, the planarized layer (planarization layer), the second transparent conductive layer, and other structures of the color filter touch sensing substrate 200 are disposed on the inner side of the color filter touch sensing substrate 200 facing the thin film transistor substrate 150.

Figure 17:
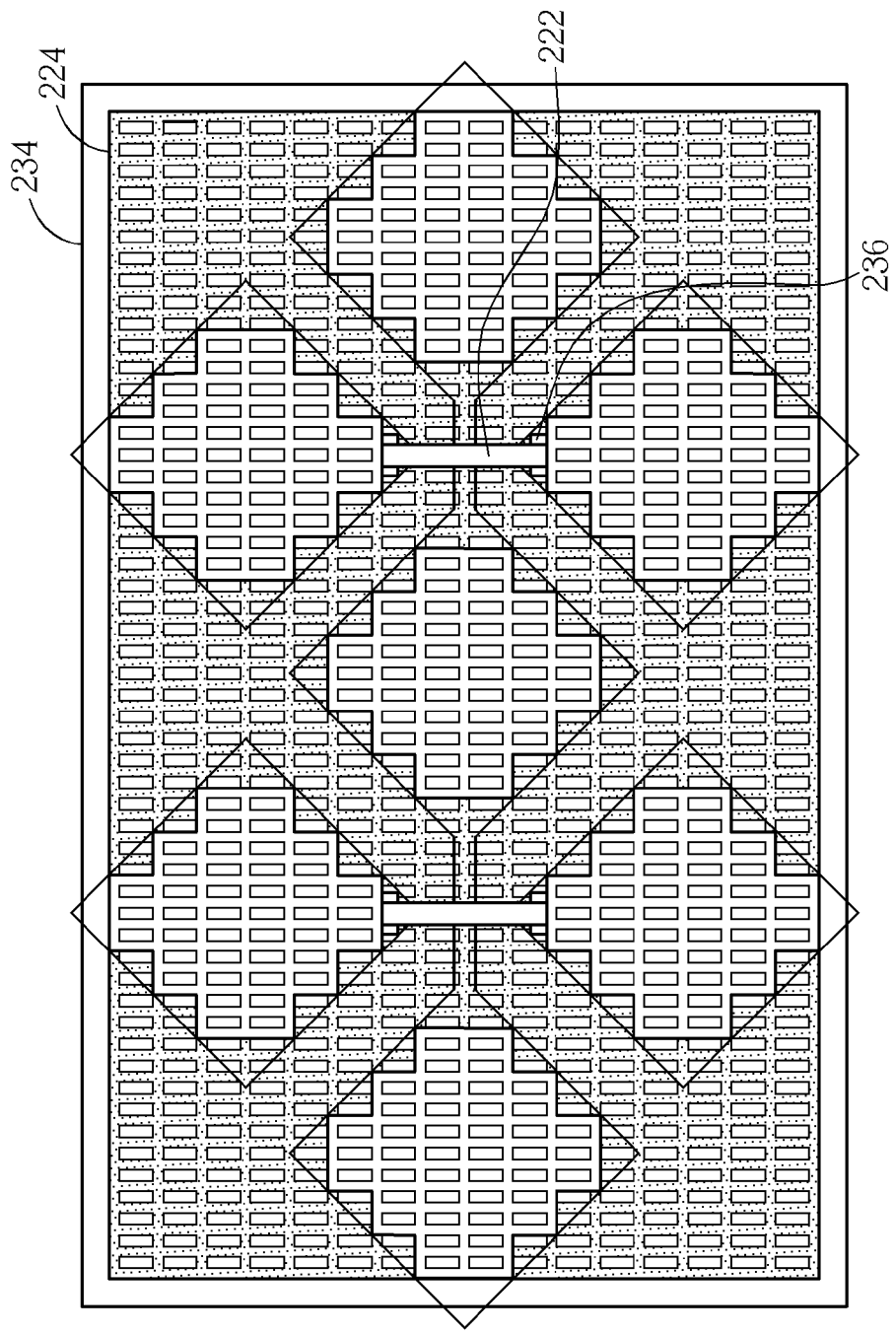
FIG. 17 schematically illustrates a method of forming a color filter touch sensing substrate according to a fourth preferred embodiment of the present invention.

FIG. 17 schematically illustrates a method of forming a color filter touch sensing substrate according to a fourth preferred embodiment of the present invention. The fourth preferred embodiment is a variation of the third preferred embodiment. The difference between the fourth and the third preferred embodiment is that, in the fourth preferred embodiment, the first bridge structure 212 and the second bridge structure 222 are isolated by the insulating layer 234 with openings 236 (can also be called the patterned insulating layer), and the insulating layer 234 covers the first and the second patterned assistant electrodes 218, 220 and the first and the second transparent sensing pads 208, 210. Please refer to the description of the insulating layer 134 and the openings 136 for the number of the openings 236, and the material and the number of layers of the insulating layer 234.

Figure 18:
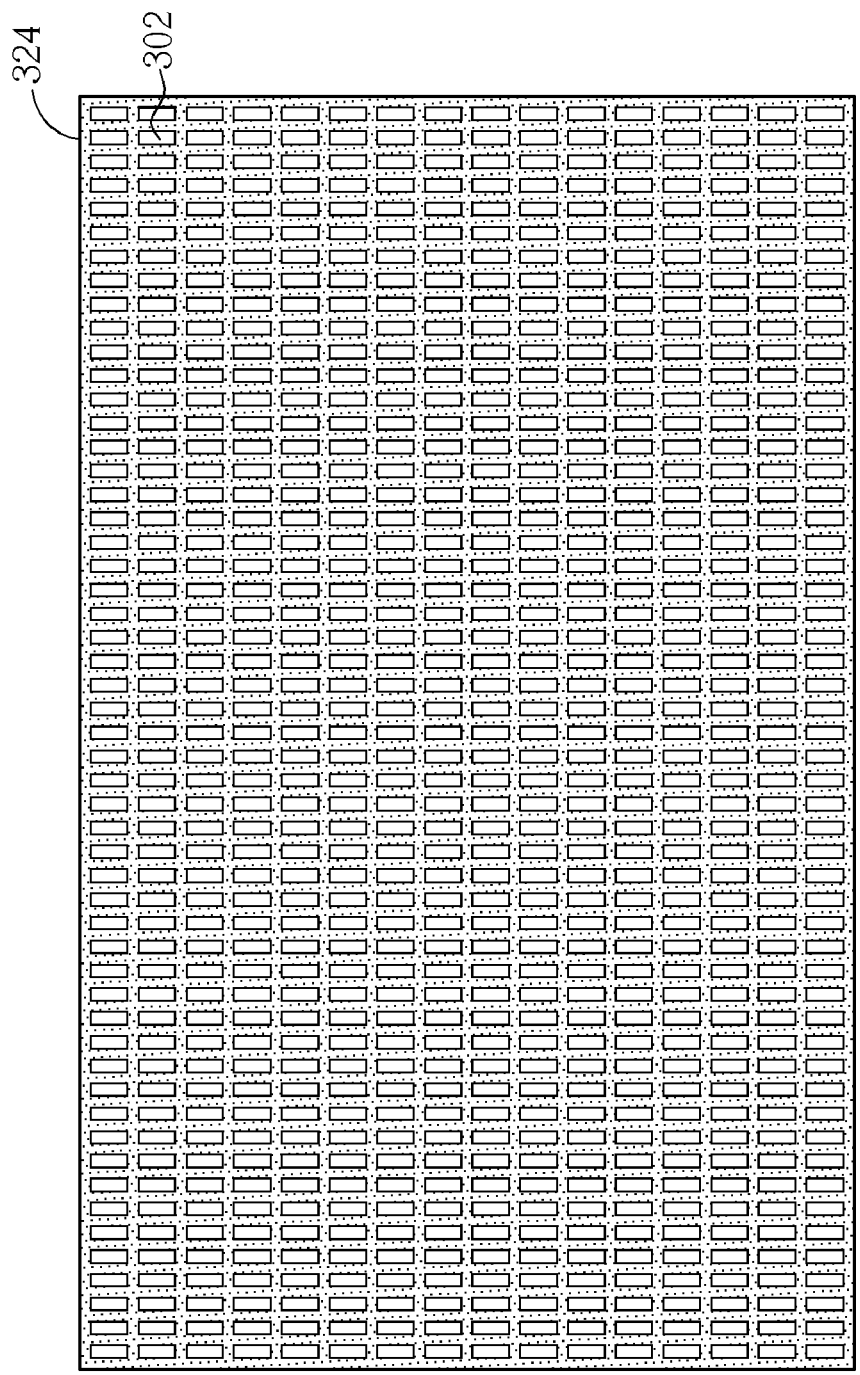
FIG. 18 to FIG. 22 schematically illustrate a method of forming a color filter touch sensing substrate according to a fifth preferred embodiment of the present invention.
Figure 21:
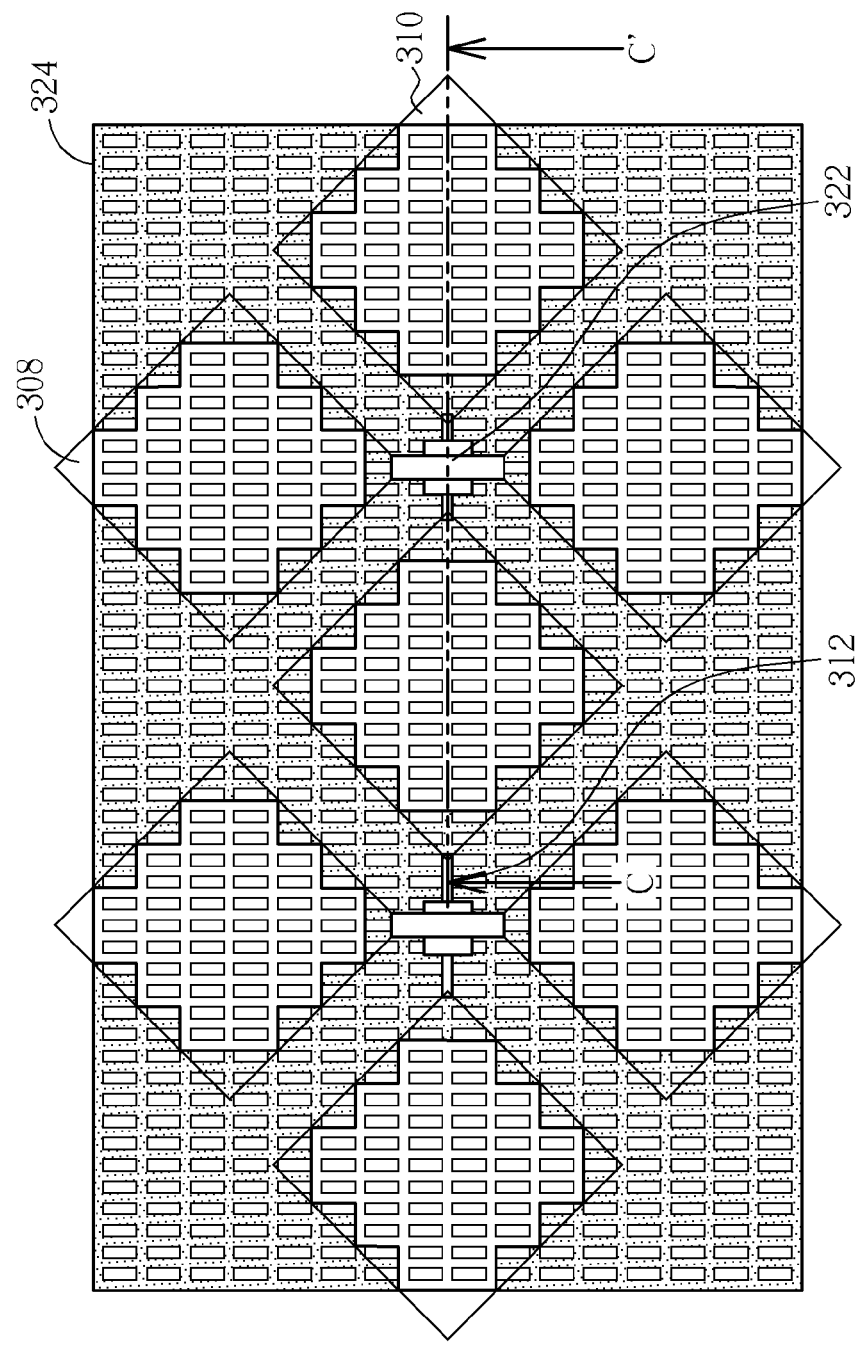
Figure 22:
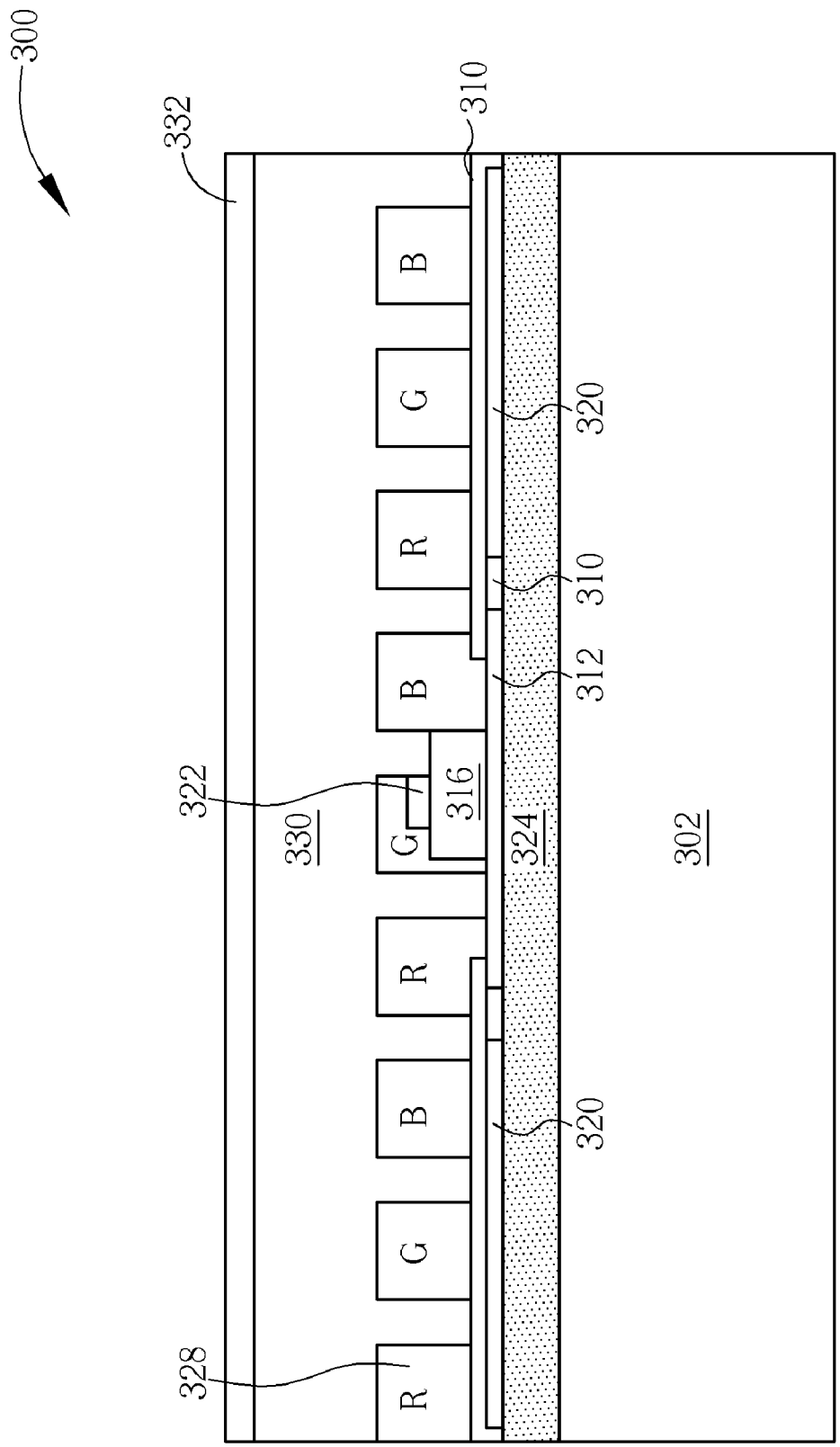

The fabricating steps of the color filter touch sensing substrate are not limited to the above-mentioned embodiment. FIG. 18 to FIG. 22 schematically illustrate a method of forming a color filter touch sensing substrate 300 according to a fifth preferred embodiment of the present invention. FIG. 18 to FIG. 21 are schematic top views illustrating the color filter touch sensing substrate 300. FIG. 22 is a schematic cross-sectional view illustrating the color filter touch sensing substrate 300 along a cross-section line C-C' in FIG. 21. The difference between the fifth preferred embodiment and other preferred embodiments is that, in the fifth preferred embodiment, the first bridge structure and the patterned assistant electrodes are formed simultaneously, and the second bridge structure and the transparent sensing pads are formed simultaneously. In this way, the fabricating process can be simplified. In addition, the materials, number of layers, numbers, usage or other related details of elements (structures) illustrated in the present embodiment, can be determined by referring to the description described in FIG. 2 to FIG. 7. As shown in FIG. 18, a transparent substrate 302 is provided, wherein the transparent substrate 302 may use the materials that the transparent substrate 102 illustrated in FIG. 2 uses. Then, a black matrix 324 having insulating characteristics is formed on a side of the transparent substrate 302 facing the thin film transistor substrate. The materials, number of layers, numbers, usage or other details of the black matrix 324 can be determined by referring to the description describing the black matrix 124 in FIG. 6.

Figure 19:
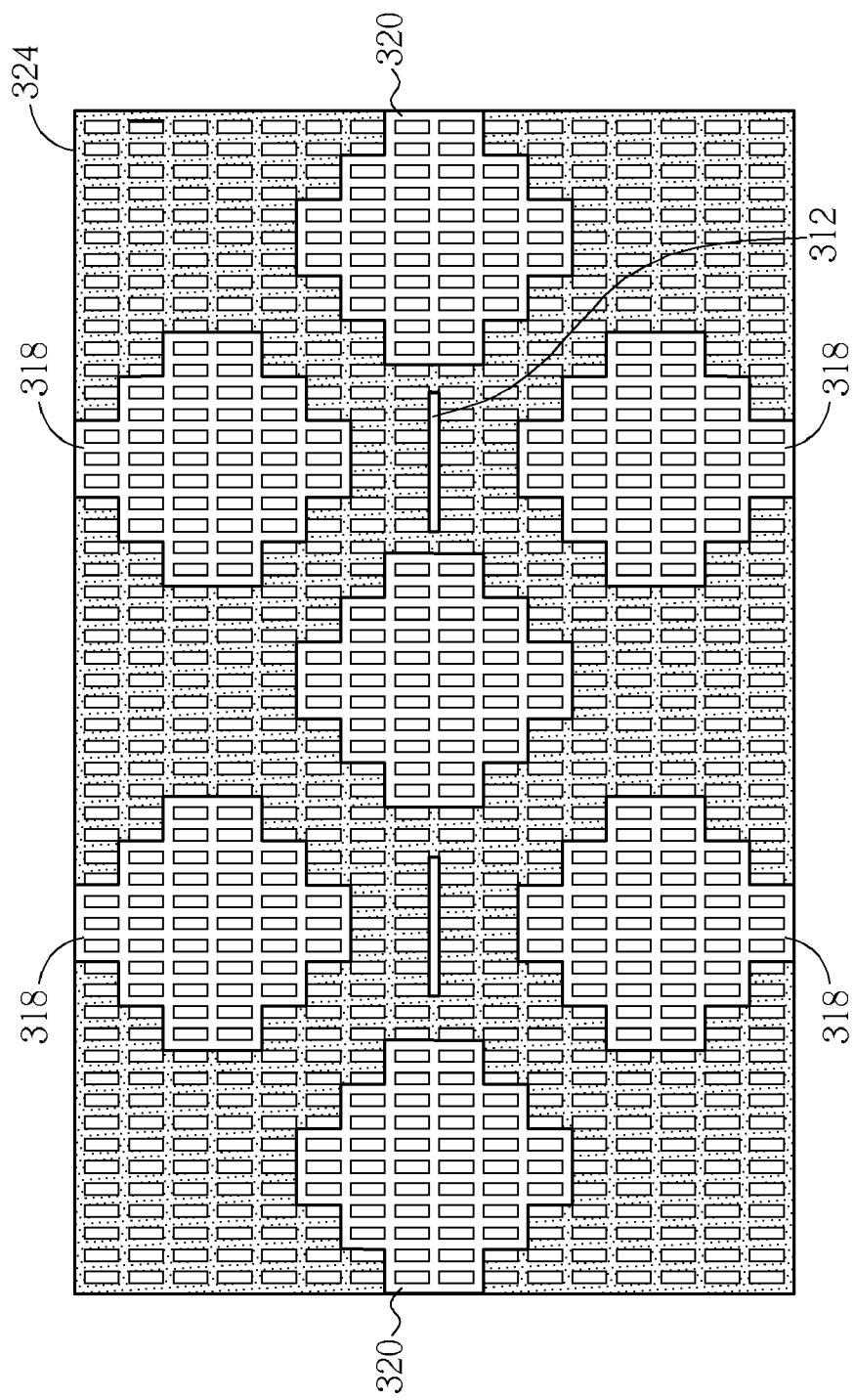

As shown in FIG. 19, at least two first patterned assistant electrodes 318, at least two second patterned assistant electrodes 320 and at least one first bridge structure 312 are formed on the black matrix 324. The first patterned assistant electrodes 318, the second patterned assistant electrodes 320 and the first bridge structure 312 are disposed corresponding to part of the black matrix 324. The first and second patterned assistant electrodes 318, 320 and the first bridge structure 312 are isolated from one another. Preferably, at least one alignment mark can be formed by the forming step of the first and second assistant electrodes 318, 320, but the invention is not limited to this embodiment.

Figure 20:
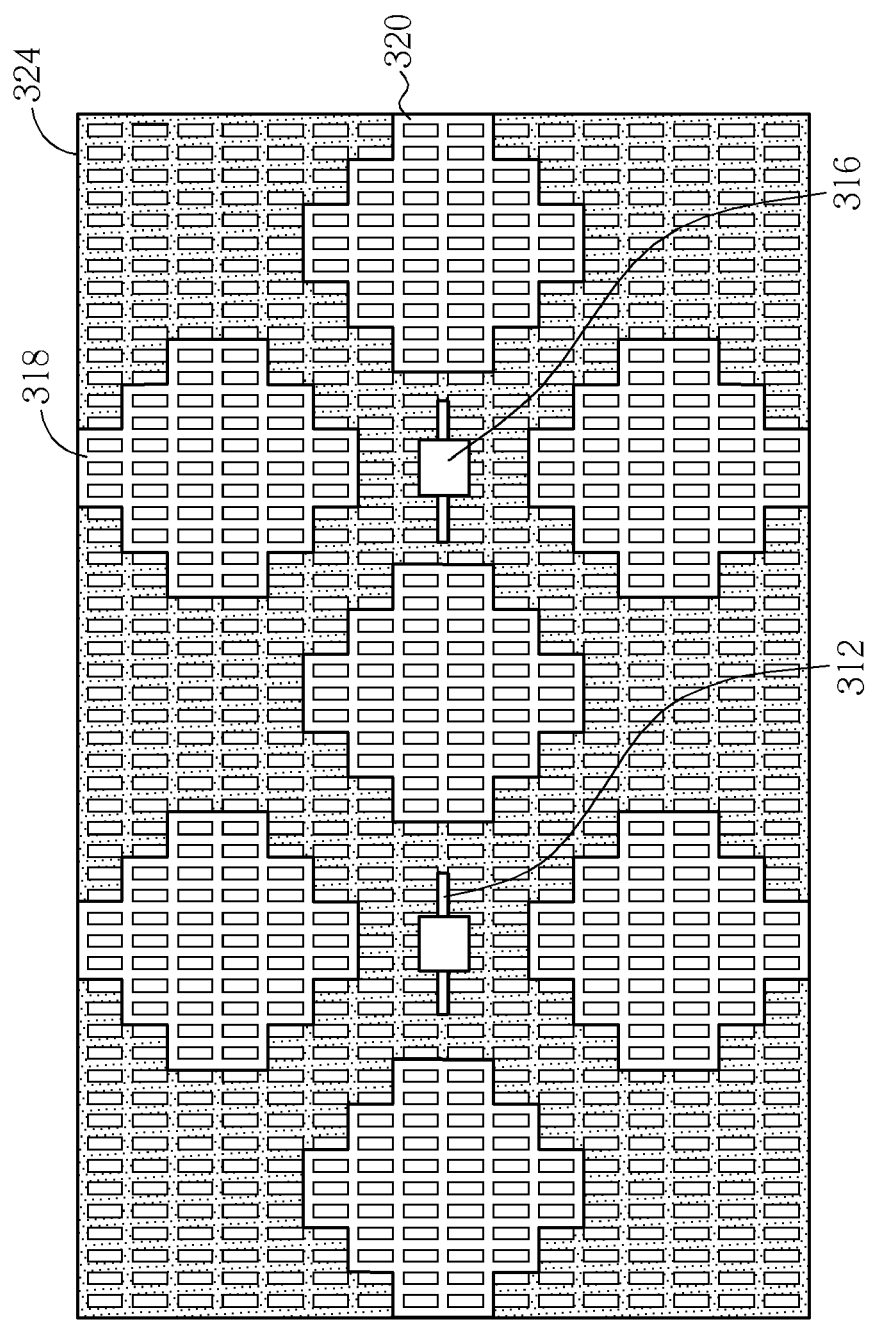

As shown in FIG. 20, at least one patterned insulating layer 316 is formed on the first bridge structure 312. As shown in FIG. 21, at least two first transparent sensing pads 308, at least two second transparent sensing pads 310, and at least one second bridge structure 322 are formed simultaneously. The first bridge structure 312 is disposed between the first transparent sensing pads 308 to be the electrical connection. The first transparent sensing pads 308 are electrically isolated (electrically insulated, isolated, or insulated) from the second transparent sensing pads 310. The second bridge structure 322 crosses the patterned insulating layer 316 and is disposed between the second transparent sensing pads 310 to serve as an electrical connection.

As shown in FIG. 22, a plurality of color filters 328, a second transparent conductive layer 332 and an optional-formed planarized layer 330 (planarization layer) are formed sequentially on the first and second transparent sensing pads 308, 310 to form the color filter touch sensing substrate 300. The detailed description of the optional-formed planarized layer 330 (planarization layer) can be found by referring to FIG. 7 and FIG. 8. The second transparent conductive layer 332 can be used as a common electrode of the color filter touch sensing substrate 300. After that, the color filter touch sensing substrate 300 can replace the color filter touch sensing substrate 100, and be assembled with the thin film transistor substrate 150 and the display medium layer 160 (not shown in FIG. 22) by the steps illustrated in FIG. 9. The first and second assistant electrodes, the first and second transparent sensing pads, the black matrix, the color filters, the second transparent conductive layer, the optional-formed planarized layer 330 (planarization layer), and other structures of the color filter touch sensing substrate 300 are disposed on the inner side of the color filter touch sensing substrate 300 facing the thin film transistor substrate 150.

Figure 23:
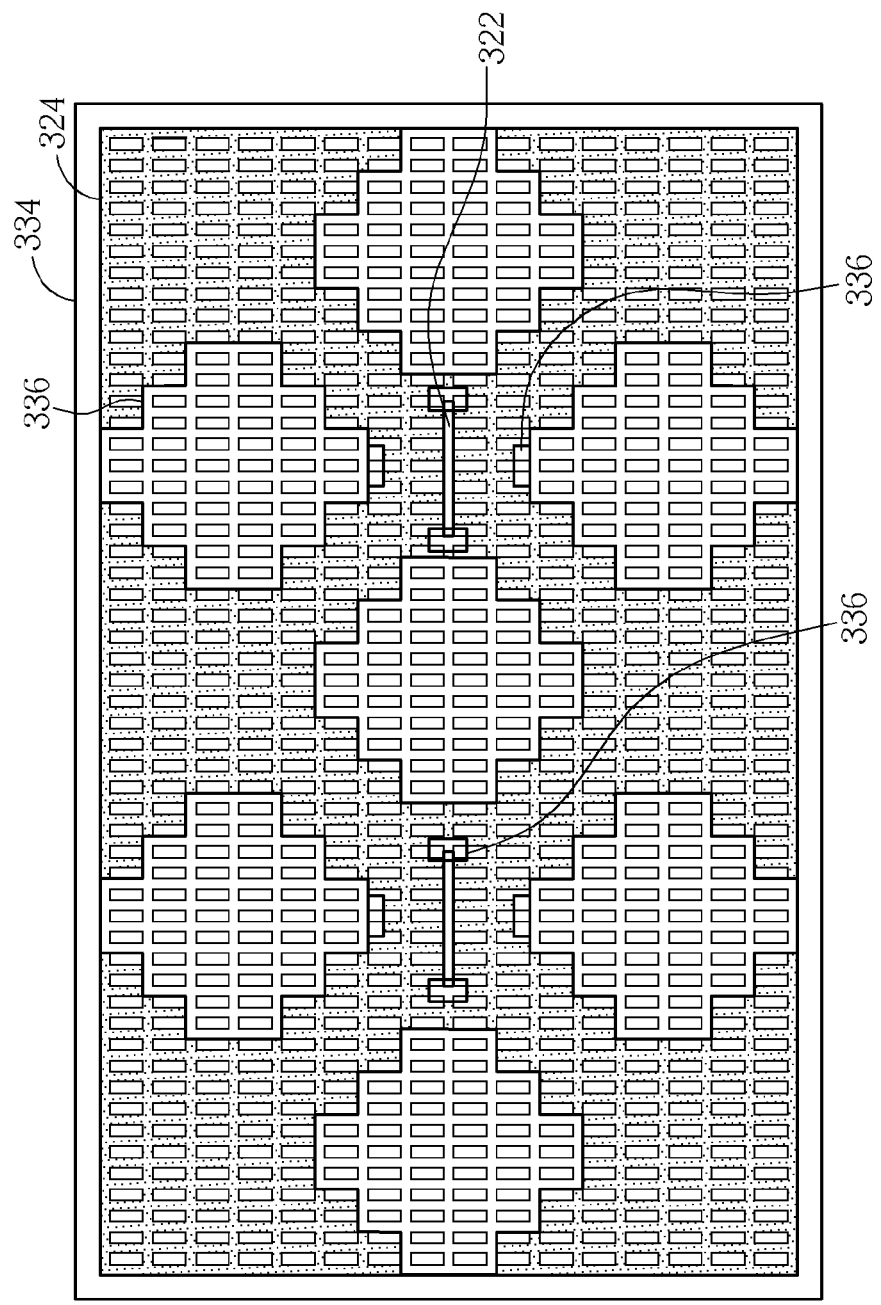
FIG. 23 schematically illustrates a method of forming a color filter touch sensing substrate according to a sixth preferred embodiment of the present invention.

FIG. 23 schematically illustrates a method of forming a color filter touch sensing substrate according to a sixth preferred embodiment of the present invention. The sixth preferred embodiment is a variation of the fifth preferred embodiment. The difference between the sixth and the fifth preferred embodiment is that, in the sixth preferred embodiment, the first bridge structure 312 and the second bridge structure 322 are electrically isolated (electrically insulated, isolated, or insulated) by the insulating layer 334 (can also be called the patterned insulating layer) with openings 336, and the insulating layer 334 covers the first and the second patterned assistant electrodes 318, 320 and the first and the second transparent sensing pads 308, 310, wherein the two ends of the first bridge structure 312 positioned under the insulating layer 336, and the first and second patterned assistant electrodes 318, 320 positioned under the insulating layer 336 can be exposed through the openings 336. The shape and the number of the openings 336 is not limited to those shown in FIG. 23. Preferably, part of the first and second patterned assistant electrodes 318, 320 is exposed through the openings 336, but not limited to this. Please refer to the description of the insulating layer 134 and the openings 136 for the related description of the number of the openings 336, and the material and the number of layers of the insulating layer 334.

According to the present invention, the patterned assistant electrode and the transparent sensing pads can be combined to form a stacked structure. In this way, the equivalent resistance of the touch-sensing structures/elements will be decreased, and the sensitivity of the touch panel can be increased. Moreover, the transparent sensing pads and the patterned assistant electrodes are formed by patterning the transparent conductive layer and the assistant electrode layer positioned next to each other, therefore, a simplified pattern transferring process can be utilized to form the transparent sensing pads and the patterned assistant electrodes. Furthermore, in the present invention, the patterned assistant electrode can be disposed between the transparent sensing pads to serve as electrical connections, and simplify the fabricating process. In addition, the method of forming a color filter touch sensing substrate of the present invention integrates touch-sensing structures/elements of a touch panel to the inner side of the color filter substrate, therefore, the reliability of the display panel is increased, the variety of the materials is enhanced, the fabrication process is simplified, and the thinning process can be performed on the outer side of the substrate to decrease the size of the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of forming a color filter touch sensing substrate, the color filter touch sensing substrate being disposed corresponding to a thin film transistor substrate, and a display medium layer being disposed between the color filter touch sensing substrate and the thin film transistor substrate, the method comprising:
   providing a transparent substrate;
   forming a black matrix on a side of the transparent substrate facing the thin film transistor substrate, wherein the black matrix is formed by insulating materials;
   forming at least two first patterned assistant electrodes and at least two second patterned assistant electrodes on the side of the transparent substrate facing the thin film transistor substrate, the at least two first patterned assistant electrodes and the at least two second patterned assistant electrodes being disposed corresponding to part of the black matrix respectively, and the at least two first patterned assistant electrodes being electrically isolated from the at least two second patterned assistant electrodes;
   forming a first transparent conductive layer on the side of the transparent substrate facing the thin film transistor substrate to cover the at least two first patterned assistant electrodes, at least two second patterned assistant electrodes, the black matrix, and part of the transparent substrate;
   patterning the first transparent conductive layer to form at least two first transparent sensing pads, at least two second transparent sensing pads and at least one first bridge structure, the at least one first bridge structure electrically connecting to the at least two first transparent sensing pads, the at least two first transparent sensing pads being disposed on the at least two first patterned assistant electrodes and on the black matrix under the at least two first patterned assistant electrodes, the at least two second transparent sensing pads being disposed on the at least two second patterned assistant electrodes and on the black matrix under the at least two second patterned assistant electrodes, and the at least two first transparent sensing pads being electrically isolated from the at least two second transparent sensing pads; and
   forming at least one second bridge structure electrically connecting to the at least two second transparent sensing pads, wherein the at least one second bridge is electrically isolated from the at least one first bridge structure.

2. The method of claim 1, further comprising:
   forming a plurality of color filters on the at least two first transparent sensing pads and the at least two second transparent sensing pads;
   forming a planarization layer on the color filters; and
   forming a second transparent conductive layer on the planarization layer.

3. The method of claim 1, wherein before forming the at least one second bridge structure, the method further comprises:
   forming at least one patterned insulating layer on the at least one first bridge structure, wherein the at least one second bridge structure crosses the at least one insulating layer so as to electrically connect to the at least two second transparent sensing pads.

4. The method of claim 1, wherein before forming the at least one second bridge structure, the method further comprises:
   forming an insulating layer covering the at least two first transparent sensing pads, the at least two second transparent sensing pads, the black matrix, part of the transparent substrate and the at least one first bridge structure, the insulating layer having a plurality of openings to expose the at least two second transparent sensing pads partially, wherein the at least one second bridge structure connects electrically to the at least two second transparent sensing pads through the openings.

5. The method of claim 1, wherein the step of forming the at least two first patterned assistant electrodes and the at least two second patterned assistant electrodes comprises forming at least one alignment mark.

6. The method of claim 1, wherein at least a part of the at least two first and the at least two second patterned assistant electrodes comprises a plurality of conductive strips, and the black matrix comprises a plurality of strip regions, and wherein the width of each of the conductive strips is substantially 6 micrometers smaller than that of each of the strip regions.

7. A method of forming a color filter touch sensing substrate, the color filter touch sensing substrate being disposed corresponding to a thin film transistor substrate, and a display medium layer being disposed between the color filter touch sensing substrate and the thin film transistor substrate, the method comprising:
   providing a transparent substrate;
   forming a black matrix on a side of the transparent substrate facing the thin film transistor substrate, wherein the black matrix is formed by insulating materials;
   forming an assistant electrode layer on the side of the transparent substrate facing the thin film transistor substrate to cover the transparent substrate and the black matrix;

patterning the assistant electrode layer to form at least two first patterned assistant electrodes, at least two second patterned assistant electrodes and at least one first bridge structure, the at least two first patterned assistant electrodes and the at least two second patterned assistant electrodes being disposed corresponding to part of the black matrix respectively, and the at least two first patterned assistant electrodes being electrically isolated from the at least two second patterned assistant electrodes;

forming a first transparent conductive layer on the side of the transparent substrate facing the thin film transistor substrate to cover the at least two first patterned assistant electrodes, the at least two second patterned assistant electrodes and the black matrix, and part of the transparent substrate; and patterning the first transparent conductive layer to form at least two first transparent sensing pads and at least two second transparent sensing pads and at least one second bridge structure, the at least one first bridge structure electrically connecting to the at least two first transparent sensing pads, the at least one second bridge structure electrically connecting to the at least two second transparent sensing pads, the at least one second bridge structure being electrically isolated from the at least one first bridge structure, the at least two first transparent sensing pads being disposed on the at least two first patterned assistant electrodes and on the black matrix under the at least two first patterned assistant electrodes, the at least two second transparent sensing pads being disposed on the at least two second patterned assistant electrodes and on the black matrix under the at least two second patterned assistant electrodes, and the at least two first transparent sensing pads being electrically isolated from the at least two second transparent sensing pads.

8. The method of claim 7, further comprising:
forming a plurality of color filters on the at least two first transparent sensing pads and the at least two second transparent sensing pads;
forming a planarization layer on the color filters; and
forming a second transparent conductive layer on the planarization layer.

9. The method of claim 7, wherein after forming the at least one first bridge structure, the method further comprises:
forming at least one patterned insulating layer on the at least one first bridge structure, wherein the at least one second bridge structure crosses the at least one patterned insulating layer so as to electrically connect to the at least two second transparent sensing pads.

10. The method of claim 7, wherein after forming the at least one first bridge structure, the method further comprises:
forming an insulating layer covering the at least two first transparent sensing pads, the at least two second transparent sensing pads, the black matrix, part of the transparent substrate and the at least one first bridge structure, and the insulating layer having a plurality of openings to expose the at least two second transparent sensing pads partially, wherein the at least one second bridge structure connects electrically to the at least two second transparent sensing pads through the openings.

11. The method of claim 7, wherein the step of patterning the assistant electrode layer comprises forming at least one alignment mark.

12. The method of claim 7, wherein at least a part of the at least two first and the at least two second patterned assistant electrodes comprises a plurality of conductive strips, and the black matrix comprises a plurality of strip regions, and wherein the width of each of the conductive strips is substantially 6 micrometers smaller than that of each of the strip regions.

* * * * *